United States Patent
An et al.

(10) Patent No.: US 12,265,355 B2
(45) Date of Patent: Apr. 1, 2025

(54) IMAGE FORMING APPARATUS HAVING GROUNDED FIXING MEMBER

(71) Applicant: CANON KABUSHIKI KAISHA, Tokyo (JP)

(72) Inventors: Koji An, Saitama (JP); Shinji Katagiri, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/388,431

(22) Filed: Nov. 9, 2023

(65) Prior Publication Data

US 2024/0069490 A1    Feb. 29, 2024

Related U.S. Application Data

(62) Division of application No. 17/944,816, filed on Sep. 14, 2022, now Pat. No. 11,841,676.

(30) Foreign Application Priority Data

Sep. 17, 2021 (JP) .................................. 2021-152694
Mar. 25, 2022 (JP) .................................. 2022-050957

(51) Int. Cl.
G03G 15/20    (2006.01)
G03G 15/00    (2006.01)
G03G 21/20    (2006.01)
G06K 15/00    (2006.01)
G06K 15/02    (2006.01)

(52) U.S. Cl.
CPC ........... G03G 21/203 (2013.01); G03G 15/80 (2013.01); G06K 15/005 (2013.01); G06K 15/021 (2013.01); G06K 15/408 (2013.01)

(58) Field of Classification Search
USPC ......................................................... 399/44
See application file for complete search history.

(56) References Cited

U.S. PATENT DOCUMENTS

| 8,265,499 B2 | 9/2012 | Sueoka |
| 2014/0079458 A1 | 3/2014 | Seto et al. |
| 2019/0137909 A1 | 5/2019 | Umeda et al. |

FOREIGN PATENT DOCUMENTS

| JP | 10-48965 A | 2/1998 | |
| JP | 2001-117390 A | 4/2001 | |
| JP | 2004126103 A * | 4/2004 | ......... G03G 15/2039 |
| JP | 2006-153932 A | 6/2006 | |
| JP | 2006195004 A * | 7/2006 | |
| JP | 2010-191276 A | 9/2010 | |
| JP | 2021-028669 A | 2/2021 | |

* cited by examiner

Primary Examiner — Quana Grainger
(74) Attorney, Agent, or Firm — Venable LLP

(57) ABSTRACT

An image forming apparatus includes an image bearing member, a transfer member, a power source, a detecting portion, a controller, an environment detecting portion, and a contact member. In a case that an absolute water content acquired on the basis of environmental information is a predetermined threshold or more, the controller sets a limit voltage on the basis of a detection result of the detecting portion in a state in which the recording material is absent in a transfer portion, and the controller controls the power source so that an absolute value of a voltage applied from the power source to the transfer member during contact of the recording material with the transfer member and the contact member is an absolute value of the limit voltage or less.

4 Claims, 12 Drawing Sheets

(a)

(b)

(a)

(b)

IMAGE FORMING APPARATUS HAVING GROUNDED FIXING MEMBER

FIELD OF THE INVENTION AND RELATED ART

The present invention relates to an image forming apparatus, such as a printer, a copying machine, or a facsimile machine, of an electrophotographic type or an electrostatic recording type.

In the image forming apparatus of the electrophotographic type, a toner image formed on an image bearing member is transferred onto a recording material such as paper passing through a transfer portion formed between the image bearing member and the transfer member.

In an image forming apparatus of an intermediary transfer type, a toner image formed on a photosensitive member or the like as a first image bearing member is primary-transferred onto an intermediary transfer member as a second image bearing member. Thereafter, the toner image on the intermediary transfer member is secondary-transferred onto the recording material passing through a transfer portion (secondary transfer portion) formed between the intermediary transfer member and a transfer member (secondary transfer member). The transfer of the toner image from the image bearing member onto the recording material is carried out by applying a transfer voltage to the transfer member. As the transfer member, a transfer roller has been widely used. In order to obtain a high-quality product (print), it is important to apply an appropriate transfer voltage to the transfer member.

In Japanese Laid-Open Patent Application (JP-A) H10-48965, a constitution in which the transfer voltage is subjected to constant-current control in a range in which an electric resistance value of the transfer roller is high, and the transfer voltage is subjected to constant-voltage control in a range in which the resistance value of the transfer voltage is low is disclosed. Further, in JP-A 2010-191276, a constitution in which a lower limit value of the transfer voltage subjected to the constant-current control is set and in which in the case where the transfer voltage is below the lower limit value, the transfer voltage is subjected to the constant voltage control is disclosed. A constant-voltage value is set so as to be capable of ensuring not less than a certain level of a transfer current flowing through the toner image even in the case where the resistance value of the transfer member continuously increased with accumulation of a use (operation) time or even in the case where the recording material absorbed moisture and the resistance value of the recording material lowered.

However, in the case where the resistance value of the recording material lowered by the influence of the moisture absorption of the recording material, at a timing when the recording material is contacted to a member, other than the transfer member, simultaneously with the transfer member, a part of the transfer current flows toward the member through the recording material in some instances. In the following, this member which contacts the recording material at a portion, other than the transfer portion, simultaneously with the transfer member and which is provided on a side downstream or upstream of the transfer portion is also referred simply to as a "contact member".

For that reason, for example, as disclosed in JP-A 2010-191276, in the case where the constant voltage value is set so that the transfer current of not less than the certain level flows through the toner image, the constant voltage value is set at a high value more than necessary in some instances so as to permit the transfer of the toner image even when the resistance value of the recording material lowers. In that case, the current flowing through the contact member also increases, with the result that there is a possibility that deterioration of the contact member is invited. For example, as the contact member, a fixing member for fixing the toner image on the recording material is used. For example, when a high current flows through this fixing member for a long time, deterioration of a member, such as energization deterioration of the fixing member is caused to occur, and finally, there is a possibility that image defect occurs.

SUMMARY OF THE INVENTION

A principal object of the present invention is to provide an image forming apparatus capable of suppressing image defect with deterioration of a contact member contacting a recording material simultaneously with a transfer member while maintaining a good transfer property.

According to an aspect of the present invention, there is provided an image forming apparatus comprising: an image bearing member configured to bear a toner image; a transfer member forming a transfer portion in contact with the image bearing member and configured to transfer the toner image from the image bearing member onto a recording material passing through the transfer portion: a power source configured to output a voltage to the transfer member; a detecting portion configured to detect at least one of a value of a current flowing through the transfer member when the voltage is outputted from the power source to the transfer member and a value of the voltage applied to the transfer member; a controller configured to control the power source; an environment detecting portion configured to detect environmental information on at least one of an ambient temperature and an ambient humidity: and a contact member provided contactable to the recording material simultaneously with the transfer member at a portion other than the transfer portion, wherein in a case that an absolute water content acquired on the basis of the environmental information is a predetermined threshold or more, the controller sets a limit voltage on the basis of a detection result of the detecting portion in a state in which the recording material is absent in the transfer portion, and the controller controls the power source so that an absolute value of the voltage applied from the power source to the transfer member during contact of the recording material with the transfer member and the contact member is an absolute value or less of the limit voltage.

According to another aspect of the present invention, there is provided an image forming apparatus comprising: an image bearing member configured to bear a toner image; a transfer member forming a transfer portion in contact with the image bearing member and configured to transfer the toner image from the image bearing member onto a recording material passing through the transfer portion; a power source configured to output a voltage to the transfer member; a detecting portion configured to detect at least one of a value of a current flowing through the transfer member when the voltage is outputted from the power source to the transfer member and a value of the voltage applied to the transfer member; a controller configured to control the power source: an input portion configured to input information on the recording material to the controller: and a contact member provided contactable to the recording material in a state in which the transfer member and the recording material are in contact with each other, wherein in a case that the information inputted by the input portion satisfies a predetermined condition set in advance, the controller sets a limit voltage on the basis of a detection result of the detecting portion in a state in which the recording material is absent in the transfer portion, and wherein the controller controls the power source so that an absolute value of the voltage applied from the power source to the transfer member during contact of the recording material with the transfer member and the contact member is an absolute value or less of the limit voltage.

Further features of the present invention will become apparent from the following description of exemplary embodiments with reference to the attached drawings.

Figure 6:
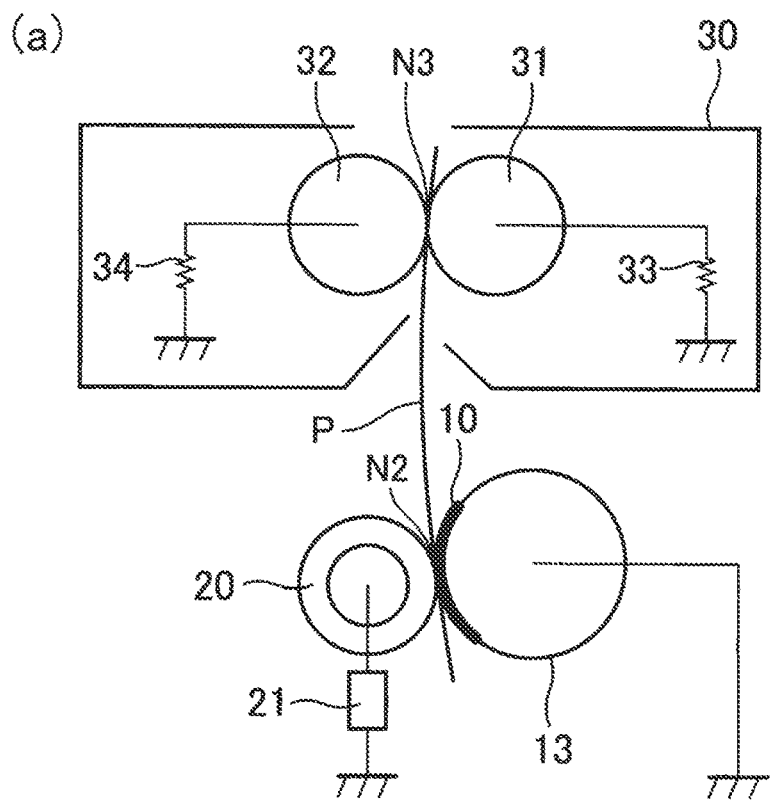
Figure 6:
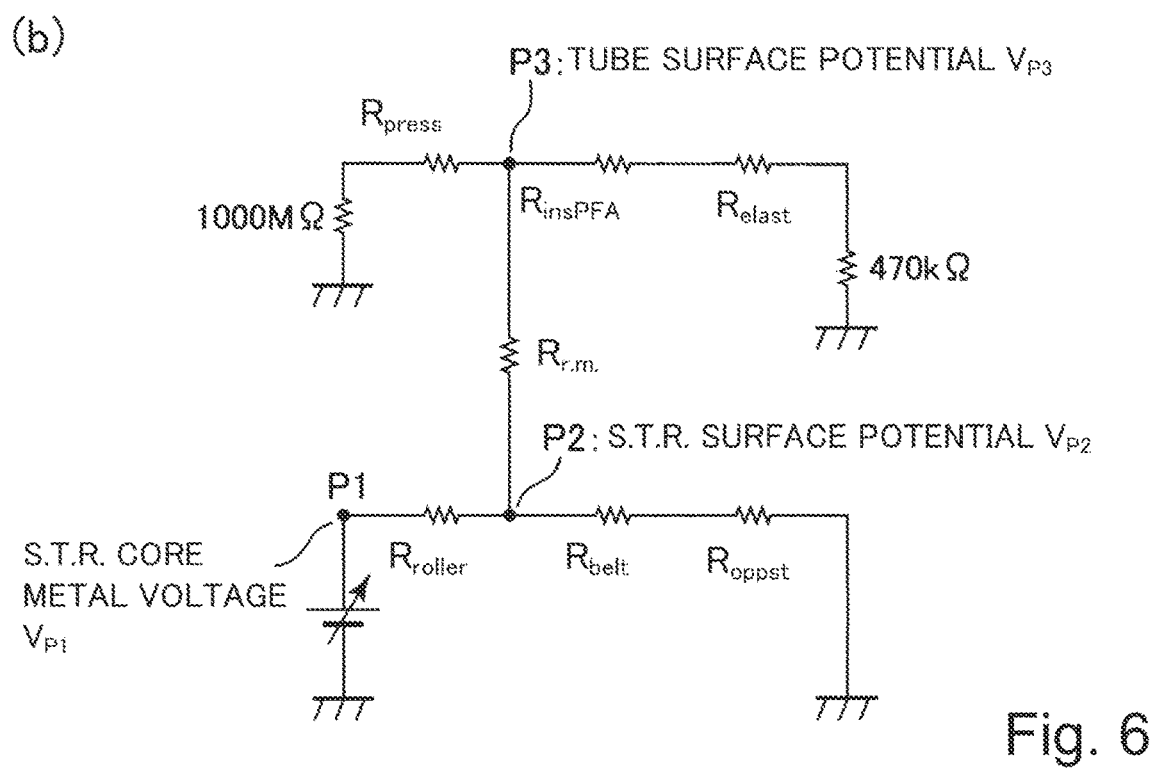

Parts (a) and (b) of FIG. 6 are a sectional view and an equivalent circuit diagram, respectively, of the secondary transfer portion and a fixing device.

Figure 7:
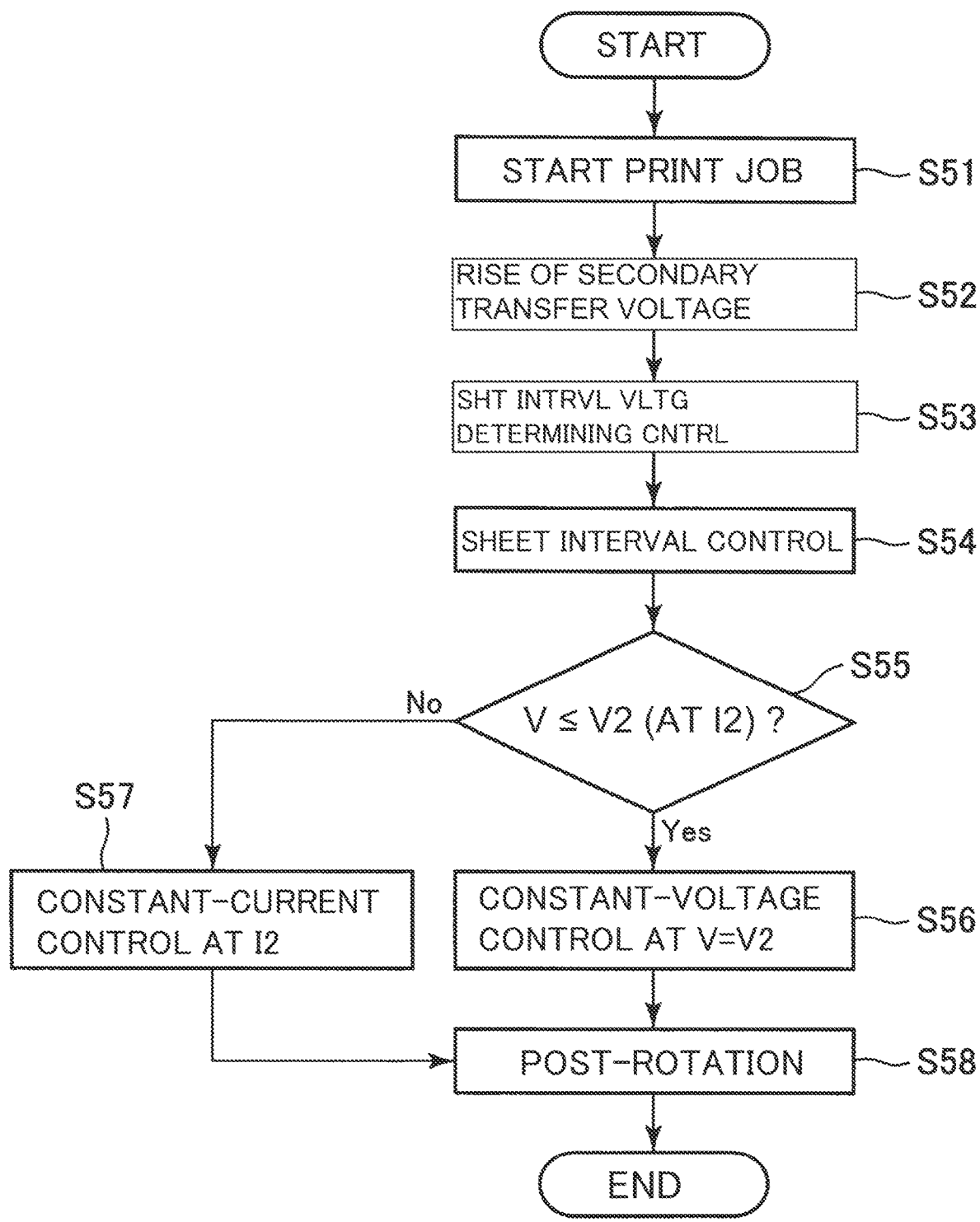

FIG. 7 is a flowchart of control of a secondary transfer voltage in a comparison example.

Figure 8:
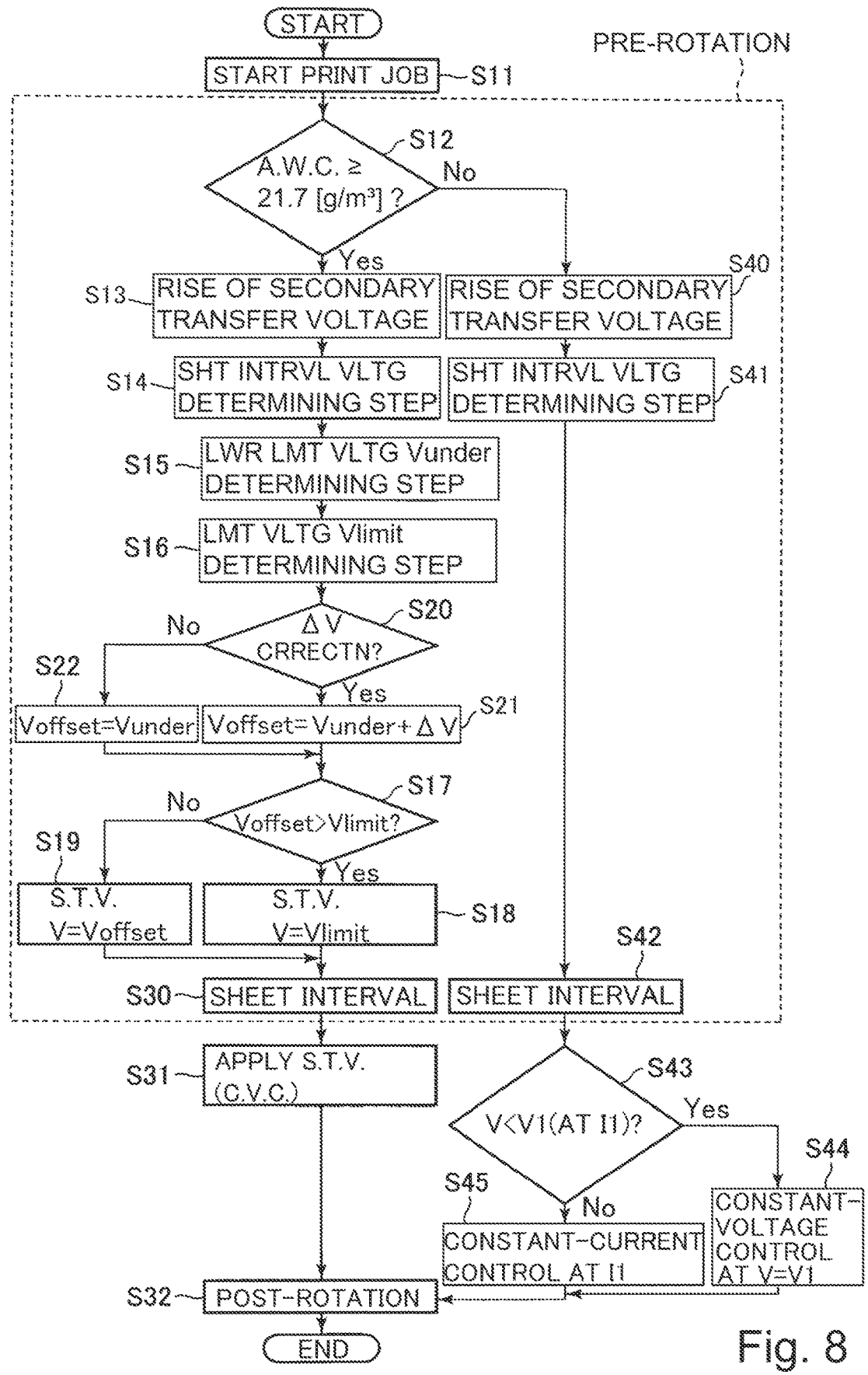

FIG. 8 is a flowchart of control of a secondary transfer voltage in an embodiment 2.

Figure 9:
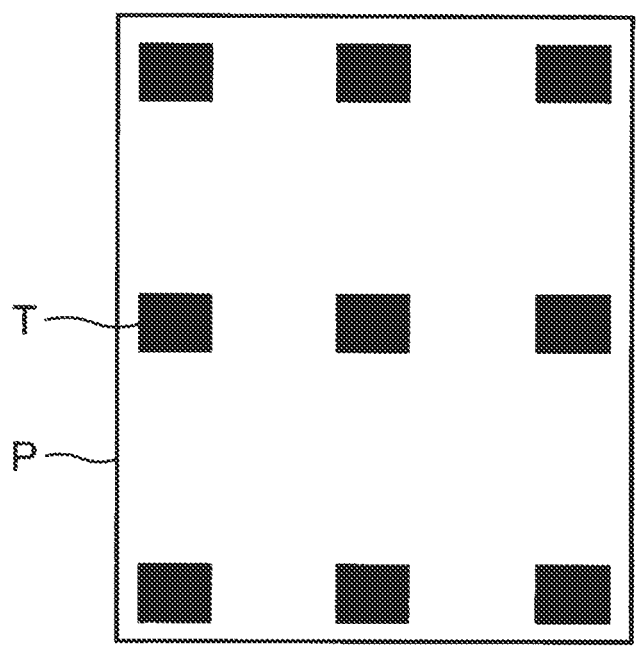
Figure 9:
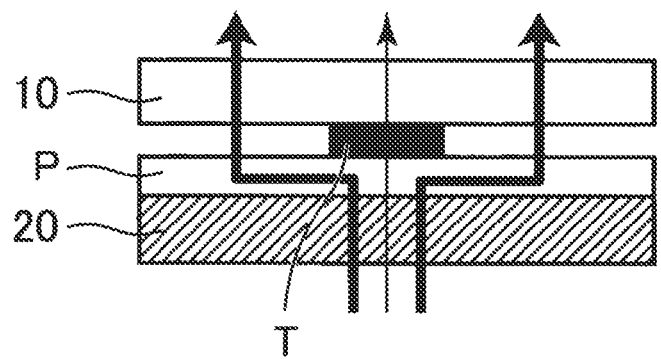

Parts (a) and (b) of FIG. 9 are schematic views for illustrating a relationship between an image pattern and image defect.

Figure 10:
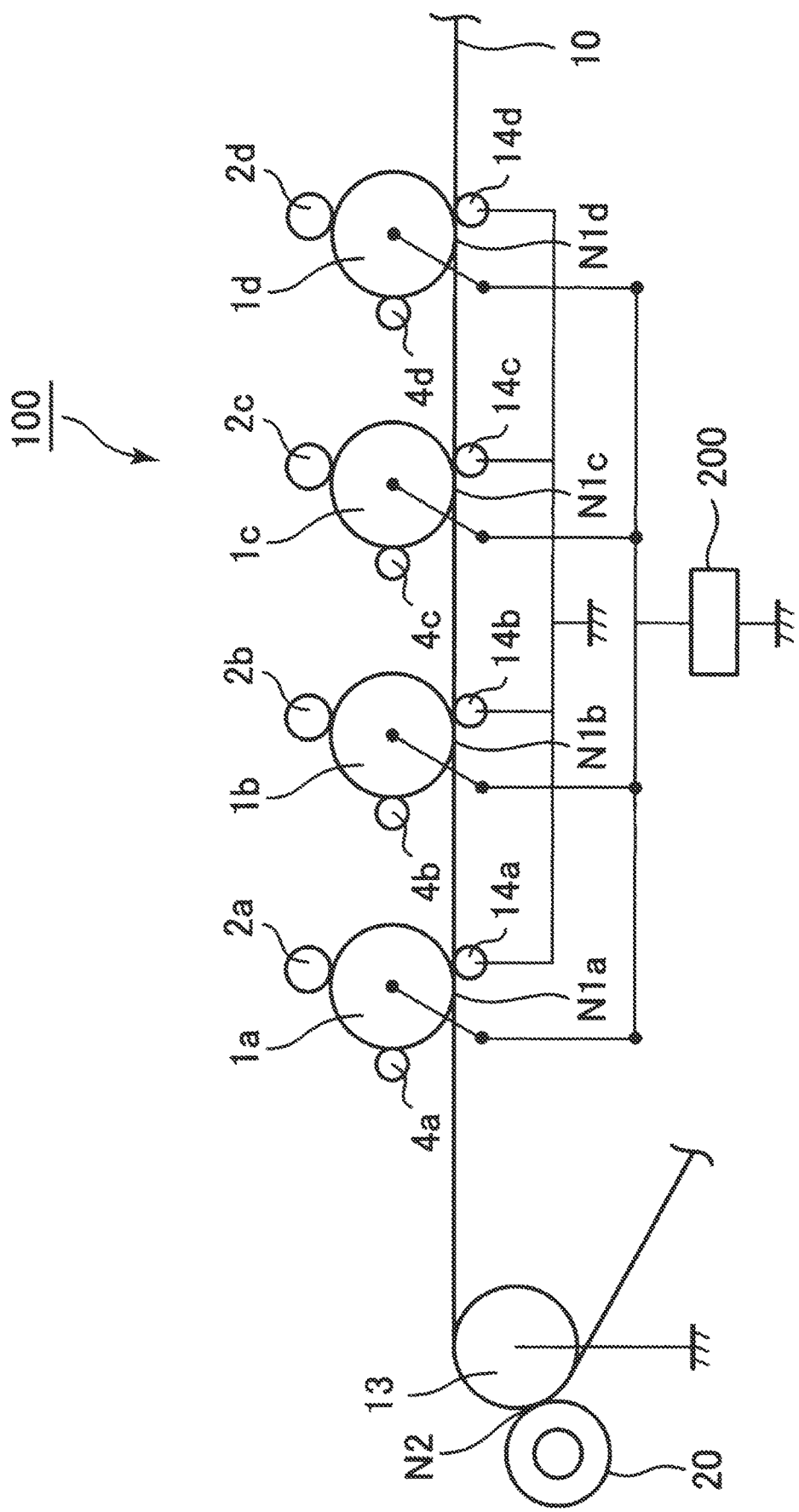

FIG. 10 is a schematic view of a structure of an image forming apparatus at a periphery of primary transfer portions in an embodiment 3.

Figure 11:
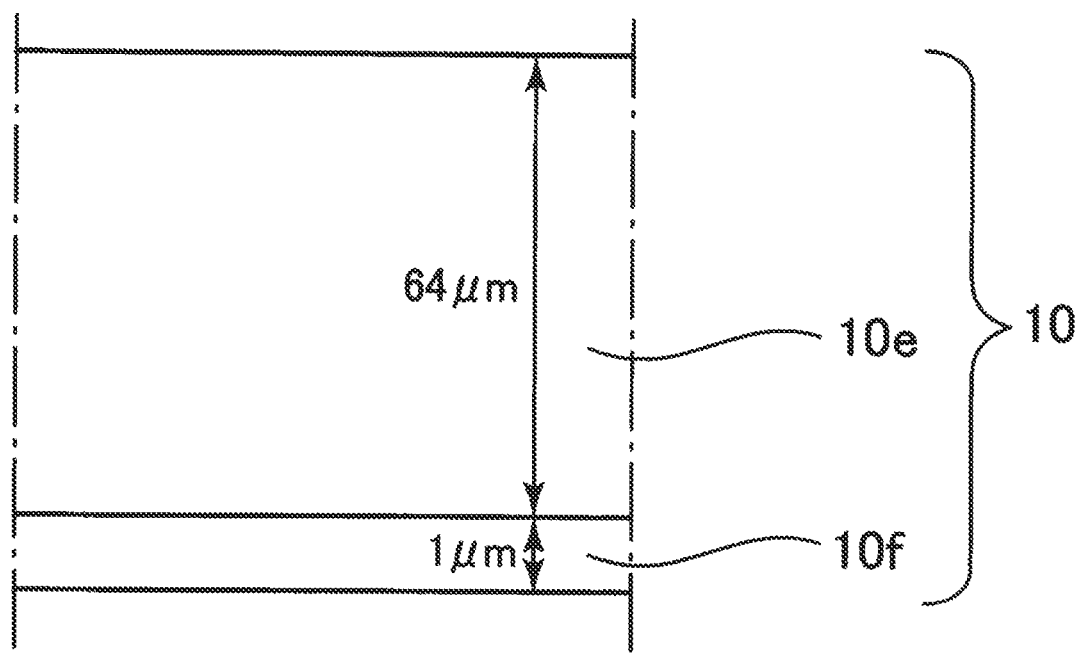

FIG. 11 is a schematic view showing a cross-sectional structure of an intermediary transfer belt in the embodiment 3.

Figure 12:
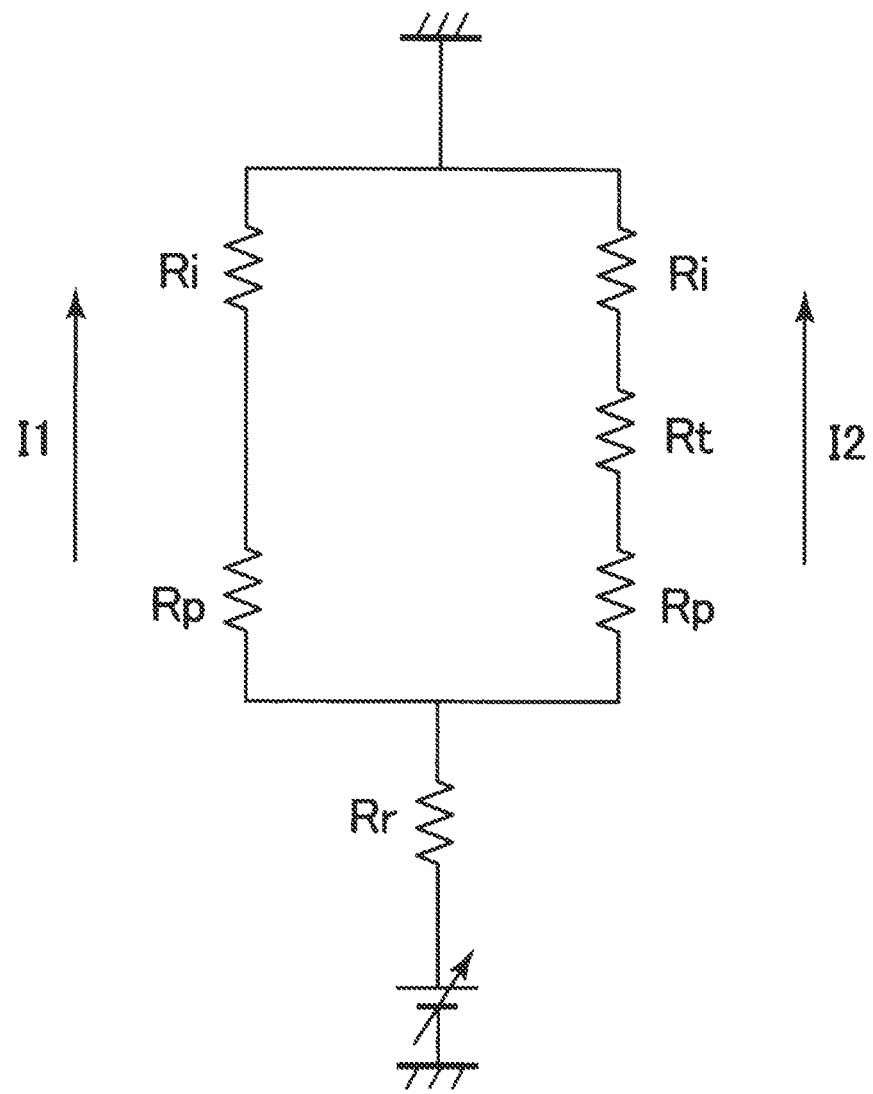

FIG. 12 is an equivalent circuit diagram relating to a secondary transfer portion in the embodiment 3.

DESCRIPTION OF THE EMBODIMENTS

In the following, an image forming apparatus according to the present invention will be described specifically with reference to the drawings.

<Overall Structure and Operation of Image Forming Apparatus>

Figure 1:
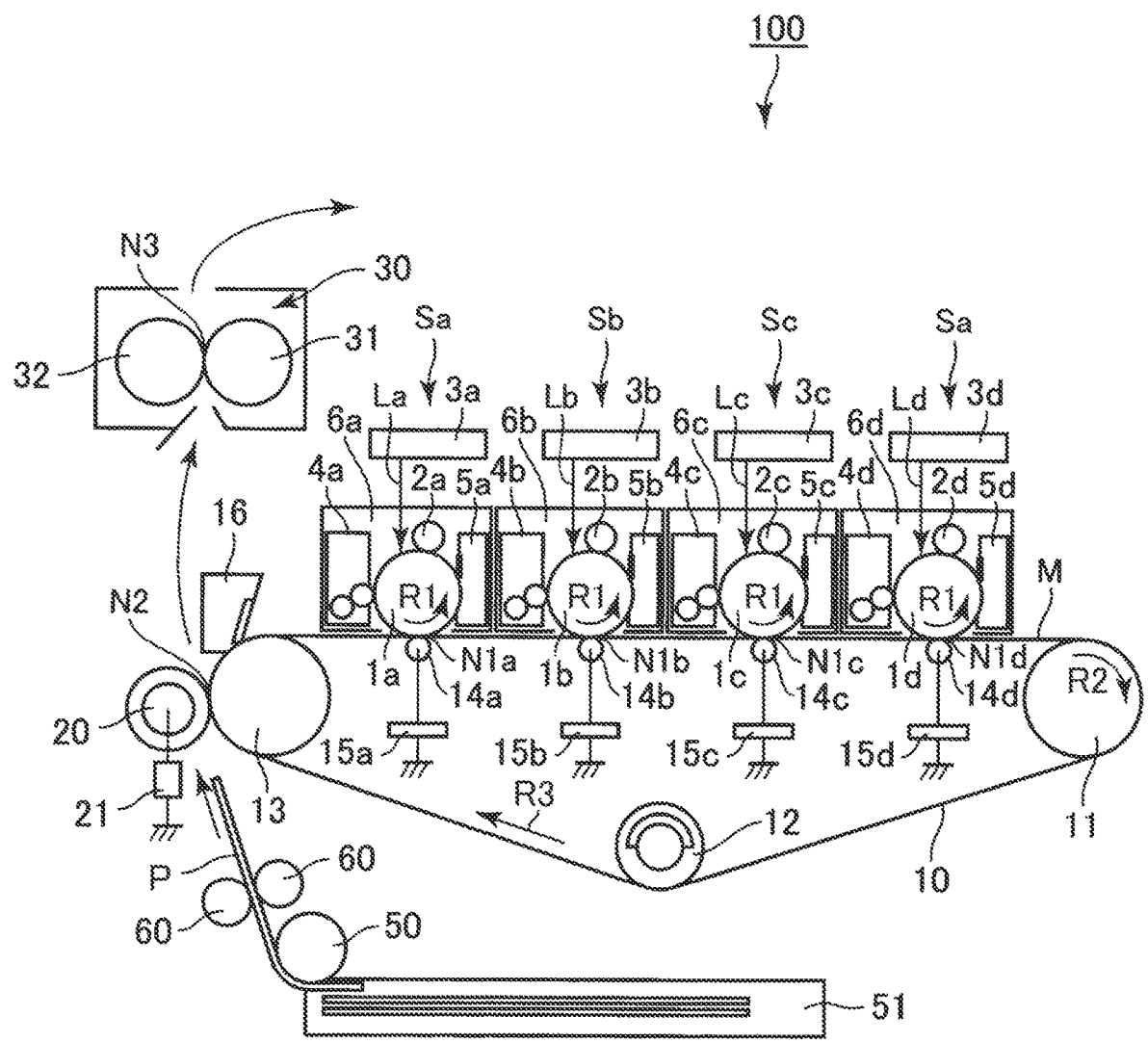
FIG. 1 is a schematic sectional view of an image forming apparatus.

FIG. 1 is a schematic sectional view of an image forming apparatus 100 of an embodiment 1. The image forming apparatus 100 of this embodiment is an electrophotographic full-color laser printer employing an in-line type system and an intermediary transfer type system. The image forming apparatus 100 is capable of forming a full-color image on a recording material P (for example, a recording sheet, a plastic sheet or the like) in accordance with image information. The image information is inputted, to the image forming apparatus 100, from an image reading apparatus provided in or connected to the image forming apparatus 100 or a host computer 199 (FIGS. 2 and 3) such as a personal computer communicatably connected to the image forming apparatus 100.

The image forming apparatus 100 includes, as a plurality of image forming portions (stations), first to fourth image forming portions Sa, Sb, Sc and Sd for forming images of yellow (Y), magenta (M), cyan (C) and black (K), respectively. In this embodiment, the first to fourth image forming portions Sa, Sb. Sc and Sd are disposed in line along a direction crossing a vertical direction. Incidentally, in this embodiment, structures and operations of the first to fourth image forming portions Sa, Sb, Sc and Sd are substantially the same except that colors of images to be formed are different from each other. As regards elements having the same or corresponding functions or constitutions in the image forming portions Sa, Sb, Sc and Sd, these elements are collectively described in some instances by omitting suffixes, a, b, c and d of reference numerals or symbols representing the elements for associated colors. The image forming portion S is constituted by including a photosensitive drum 1 (1a, 1b, 1c, 1d), a charging roller 2 (2a, 2b, 2c, 2d), an exposure device 3 (3a, 3b, 3c, 3d), a developing device 4 (4a. 4b, 4c, 4d), a primary transfer roller 14 (14a, 14b, 14c, 14d), a drum cleaning device 5 (5a, 5b, 5c, 5d), and the like which are described later.

The photosensitive drum 1 which is a rotatable drum type (cylindrical) photosensitive member (electrophotographic photosensitive member) as a first image bearing member is rotationally driven at a predetermined peripheral speed (process speed) in an arrow R1 direction (counterclockwise direction) in FIG. 1 by a driving motor as a driving means (driving source).

A surface of the photosensitive drum 1 is electrically charged substantially uniformly to a predetermined polarity (negative in this embodiment) and a predetermined potential by the charging roller 2 which is a roller type charging member as a charging means.

The charged surface of the photosensitive drum 1 is subjected to scanning exposure in accordance with image information by the exposure device (laser scanner unit) 3, so that an electrostatic latent image (electrostatic image) in accordance with the image information is formed on the photosensitive drum 1. The exposure device 3 irradiates the photosensitive drum 1 with laser light L on the basis of an output calculated from the image information, inputted from, for example, the host computer 199 (FIG. 2), by a CPU circuit portion 150 (FIG. 2) described later. The electrostatic latent image formed on the photosensitive drum 1 is developed (visualized) by being supplied with the toner as a developer by the developing device 8 as a developing means, so that a toner image (developer image) is formed on the photosensitive drum 1. In this embodiment, on an exposure portion (image portion) of the photosensitive drum 1 where an absolute value of a potential is lowered through exposure to light after the uniform charging process, the toner charged to the same polarity (negative in this embodiment) as the charge polarity of the photosensitive drum 1 is deposited (reverse development type). In this embodiment, a normal charge polarity of the toner which is the charge polarity of the toner during the development is the negative polarity.

An intermediary transfer belt 10 which is an intermediary transfer member constituted by an endless belt as a second image bearing member is disposed opposed to the four photosensitive drums 1a to 1d. The intermediary transfer belt 10 is extended around, as a plurality of supporting members (stretching rollers), a driving roller 11, a tension roller 12, and a secondary transfer opposite roller 13, and is stretched by a predetermined tension. The intermediary transfer belt 10 is contacted to the four photosensitive drums 1 in a transfer-receiving surface M formed between the secondary transfer opposite roller 13 and the driving roller 11. The driving roller 11 is rotationally driven in an arrow R2 direction (clockwise direction) in FIG. 1 by the driving motor as the driving means (driving source). By this, the intermediary transfer belt 10 is rotated (circulated and moved) at a peripheral speed (process speed) corresponding to the peripheral speed of the photosensitive drum 1 in an arrow R3 direction (clockwise direction) in FIG. 1. On an inner peripheral surface side of the intermediary transfer belt 10, corresponding to the photosensitive drums 1a to 1d, the primary transfer rollers 14a to 14d which are roller type primary transfer members as primary transfer means are provided. Each primary transfer roller 14 presses the intermediary transfer belt 10 toward the associated photosensitive drum 1 and forms a primary transfer portion (primary transfer nip) N1 which is a contact portion between the photosensitive drum 1 and the intermediary transfer belt 10. The toner image formed on the photosensitive drum 1 is transferred (primary-transferred) onto the rotating intermediary transfer belt 10 by the action of the primary transfer roller 14 in the primary transfer portion N1. During a primary transfer step, to the primary transfer roller 14, a primary transfer voltage (primary transfer bias) of a polarity (positive in this embodiment) opposite to the normal charge polarity of the toner is applied by a primary transfer power (voltage) source (high-voltage (power) source) 15 as a primary transfer voltage applying means (primary transfer voltage applying portion). For example, during full-color image formation, toner images of yellow, magenta, cyan and black formed on the respective photosensitive drums 1a to 1d are successively primary-transferred superposedly onto the intermediary transfer belt 10.

On an outer peripheral surface side of the intermediary transfer belt 10, at a position opposing the secondary transfer opposite roller (inner secondary transfer roller) 13, a secondary transfer roller (outer secondary transfer roller) 20 which is a roller type secondary transfer member as a secondary transfer means is provided. The secondary transfer roller 20 is pressed toward the secondary transfer opposite roller 13 and is contacted to the secondary transfer opposite roller 13 through the intermediary transfer belt 10, so that the secondary transfer roller 20 forms a secondary transfer portion (secondary transfer nip) N2 which is a contact portion between the intermediary transfer belt 10 and the secondary transfer roller 20. The toner image formed on the intermediary transfer belt 10 is transferred (secondary-transferred) onto the transfer material P fed while being nipped between the intermediary transfer belt 10 and the secondary transfer roller by the action of the secondary transfer roller 20 in the secondary transfer portion N2. During a secondary transfer step, to the secondary transfer roller 25, a secondary transfer voltage (secondary transfer bias) of the polarity (positive in this embodiment) opposite to the normal charge polarity of the toner is applied by a secondary transfer power source (high voltage power source) 21 as a secondary transfer voltage applying means (secondary transfer voltage applying portion). In this embodiment, the secondary transfer opposite roller 13 is connected to the ground (ground potential). For example, during the full-color image formation, the four color toner images on the intermediary transfer belt 10 are collectively transferred onto the recording material P in the secondary transfer portion N2. The recording materials S are accommodated in a cassette 51 as a recording material accommodating portion.

The recording materials P are fed one by one from the cassette 51 by a feeding roller 50 or the like as a feeding means, and the fed recording material P is conveyed to a registration roller pair 60 and 60. Then, this recording material P is conveyed by the registration roller pair 60 and 60 by being timed to the toner images on the intermediary transfer belt 10. A feeding timing of the recording material P by the registration roller pair 60 and 60 is controlled on the basis of a detection result of a registration sensor (not shown) for detecting a leading end of the recording material P with respect to the feeding direction of the recording material P.

Incidentally, a constitution in which a voltage of the same polarity as the normal charge polarity of the toner is applied to the inner secondary transfer roller corresponding to the secondary transfer opposite roller 13 in this embodiment and in which the outer secondary transfer roller corresponding to the secondary transfer roller 20 in this embodiment is connected to the ground can also be employed.

The recording material P on which the toner images are transferred is conveyed to a fixing device 30 as a fixing means. The fixing device 30 includes a fixing roller 31 provided with a heat source and a pressing roller 32 press-contacted to the fixing roller 31. In the fixing device 30, heat and pressure are applied to the recording material S, on which the unfixed toner images are carried, in a fixing portion (fixing nip) N3 which is a contact portion between the fixing roller 31 and the pressing roller 32, so that the toner images are fixed (melted and stacked) on the recording material P. For example, during the full-color image formation, the four color toner images on the recording material P are melted and color-mixed by being heated and pressed in the fixing portion N3 and are fixed on the recording material P. The recording material P on which the toner images are fixed is discharged (outputted) from an apparatus main assembly of the image forming apparatus 100.

On the other hand, a deposited matter such as toner (primary transfer residual toner) remaining on the photosensitive drum 1 after the primary transfer is removed and collected from the surface of the photosensitive drum 1 by the drum cleaning device 5 as the intermediary transfer belt member cleaning means. Further, a deposited to matter such as toner (secondary transfer residual toner) remaining on the intermediary transfer belt 13 after the secondary transfer is removed and collected from the surface of the intermediary transfer belt 13 by a belt cleaning device 16 as an intermediary transfer member cleaning means.

Incidentally, the image forming apparatus 100 is also capable of forming a monochromatic (single color) image or a multi-color image by using only a single image forming portion S or some (not the all) of the image forming portions S.

Further, in each of the image forming portions S, the photosensitive drum 1 and, as process means actable on the photosensitive drum 1, the charging roller 2, the developing device 4, and the drum cleaning device 5 integrally constitute a process cartridge 6 detachably mountable to the apparatus main assembly of the image forming apparatus 100. The process cartridge 6 is capable of being mounted in and dismounted from the apparatus main assembly through mounting means such as a mounting guide and a positioning member which are provided in the apparatus main assembly.

Further, the image forming apparatus 100 of this embodiment is capable of forming and outputting the image at a process speed of 148 mm/sec on an A5-size paper, an A4-size paper, a LTR-size paper, or the like.

Here, in this embodiment, the secondary transfer roller 20 is contacted to the intermediary transfer belt 20 by a pressing force of 50N and forms the secondary transfer portion N2. The secondary transfer roller 20 is rotated with rotation of the intermediary transfer belt 10. The recording material P such as the paper is nipped and fed by the intermediary transfer belt 10 and the secondary transfer roller 20 in the secondary transfer portion N2. The secondary transfer roller 20 is a roller of 18 mm in outer diameter in which a nickel-plated steel rod of 8 mm in outer diameter is used as a core metal and is covered around thereof with a foamed sponge material which is used as an elastic layer and which is principally formed in a thickness of 5 mm with an NBR-epichlorohydrin rubber adjusted to have a volume resistivity of $10^8$ Ω·cm. Incidentally, in this embodiment, a secondary transfer power (voltage) source 21 is capable of outputting a voltage in a range of 100 V-5000 V, and a voltage of an opposite polarity to a normal charge polarity (negative in this embodiment) is applied to the secondary transfer roller 20. Incidentally, herein, a numerical range shown by using "-" means that the numerical range is a range including numerical values before and after the "-".

Further, with reference to part (a) of FIG. 6, a structure of the fixing device 30 will be further described. Part (a) of FIG. 6 is a schematic sectional view of the secondary transfer portion N2 and the fixing device 30 of the image forming apparatus 100. In this embodiment, the fixing roller 31 as a fixing member is a roller of 18 mm in outer diameter in which an elastic layer of an insulating silicone rubber is formed around a metal bare tube and an outer peripheral surface of the elastic layer is coated with an insulating PFA tube. This fixing roller 31 includes a halogen heater (not shown) as a heating means. The halogen heater is in non-contact with the fixing roller 31 and generates heat by being supplied with a voltage by a power source (not shown). Further, in this embodiment, the pressing roller 32 as a pressing member is a roller of 18 mm in outer diameter in which an elastic layer of an electroconductive silicone rubber is formed around a core metal and an outer peripheral surface of the elastic layer is coated with an electroconductive PFA tube. The fixing roller 31 and the pressing roller 32 form the fixing portion N3 by being pressed by a pressing force of 10 kgf. The pressing roller 32 is rotationally driven by a driving motor as a driving means (driving source). The fixing roller 31 is rotated with rotation of the pressing roller 32. The recording material P is nipped and fed in the fixing portion N3 by the fixing roller 31 and the pressing roller 32. The fixing roller 31 is connected from the metal bare tube to the ground (electrically grounded) through a resistance element 33 of 470 kΩ. The pressing roller 32 is connected from the core metal to the ground (electrically grounded) through a resistance element 34 of 1000 MΩ. Electric charges on the fixing roller 31 and the pressing roller 32 are caused to escape to the ground through the fixing roller 31 and the resistance element 33, and through the pressing roller 32 and the resistance element 34, so that it is possible to suppress that the surface of the fixing roller 31 and the surface of the pressing roller 32 are electrically charged.

Figure 2:
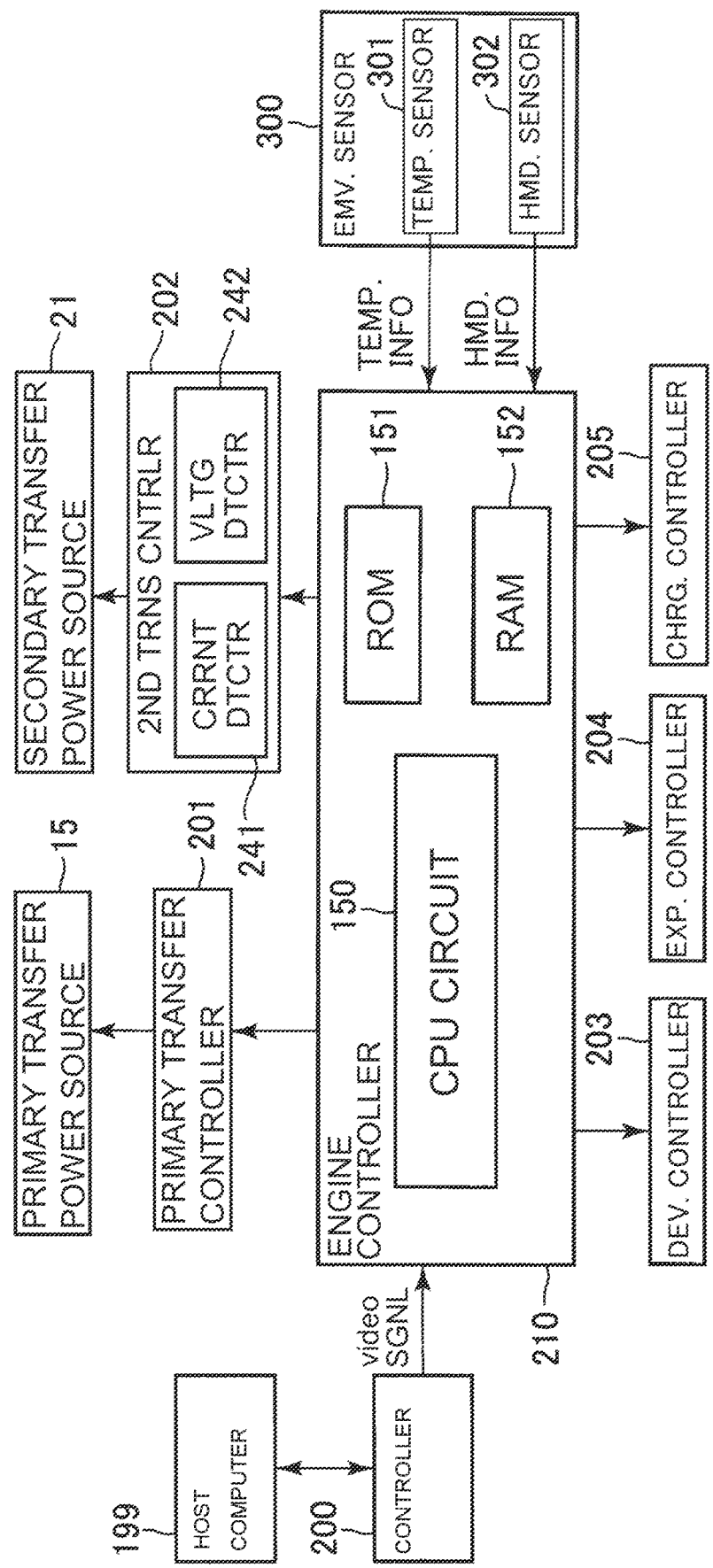
FIG. 2 is schematic a block diagram showing a control mode of the image forming apparatus.

FIG. 2 is a block diagram for illustrating a constitution of an engine controller 210 for controlling entirety of the image forming apparatus 100 of this embodiment. The engine controller 210 incorporates a CPU circuit portion 150, a ROM 151, and a RAM 152. The CPU circuit portion 150 carries out integrated control of a primary transfer controller 201, a secondary transfer controller 202, a development controller 203, an exposure controller 204, a charge controller 205, and the like in accordance with a control program stored in the ROM 151. Control tables (environmental table, recording material width/recording material thickness correspondence table, and the like) relating to control of the secondary transfer voltage, which are described later, are stored in the ROM 151, and the CPU circuit portion 150 calls up the control tables and references the control tables in control. The RAM 152 temporarily holds control data and is used as an operation area of a calculation (computation) process with the control.

The primary transfer controller 201 and the secondary transfer controller 202 control the primary transfer power source (voltage source) 15 and the secondary transfer power source (voltage source) 21, respectively, under control of the engine controller 210. The primary transfer controller 201 and the secondary transfer controller 202 control voltages outputted from the primary transfer power source 15 and the secondary transfer power source 21, respectively, on the basis of a current value or the like detected by an associated one of current detecting portions (control detecting circuits). Control of the secondary transfer voltage will be described specifically later.

To the engine controller 210, an environmental sensor 300 as an environment detecting means (environment detecting portion) for detecting at least one of a temperature and a humidity in at least one of an inside and an outside of the image forming apparatus 100 is connected. In this embodiment, the environmental sensor 300 incorporates a temperature sensor 301 as a temperature detecting means (temperature detecting portion) and a humidity sensor 302 as a humidity detecting means (humidity detecting portion), and detects an ambient temperature and an ambient humidity of the image forming apparatus 100. The environmental sensor 300 inputs, to the engine controller 210, a signal indicating a detection result of the temperature by the temperature sensor 301 (temperature information) and a signal indicating a detection result of the humidity (relative humidity) by the humidity sensor 302 (humidity information).

Further, to the engine controller 210, the controller 200 is connected. The controller 200 receives print information (image information), various pieces of setting information, and a print instruction (start instruction of a print job) from the host computer (host device) 199, which is an external device. Then, the engine controller 210 executes an operation of the print job by controlling the respective controllers (the primary transfer controller 201, the secondary transfer controller 202, the development controller 203, the exposure controller 204, the charge controller 205, and the like). Incidentally, in this embodiment, in order to carry out the control of the secondary transfer voltage (described later), the engine controller 210 acquires the environmental information from a detection result of the environment sensor 300 and acquires information relating to the recording material P from the print information from the host computer 199. Incidentally, the print information is inputted from the host device 199 to the controller 200 through a printer driver installed in the host device 199.

Here, the image forming apparatus 100 executes the print job (printing job, image output operation) which is a series of operations which is started by a single start instruction and in which an image is formed and outputted on a single recording material P or images are formed and outputted on a plurality of recording materials P. The print job generally includes an image forming step, a pre-rotation step, a sheet (paper) interval step in the case where the images are formed on the plurality of recording materials P, and a post-rotation step. The image forming step (print step) corresponds to a period in which formation of the electrostatic latent image for the image actually formed and outputted on the recording material P, formation of the toner image, primary transfer of the toner image, and secondary transfer of the toner image are performed, and during image formation (image forming period) means this period. Specifically, at positions where the respective steps of the formation of the electrostatic latent image, the formation of the toner image, the primary transfer of the toner image, and the secondary transfer of the toner image are carried out, timings during the image formation are different from each other. The pre-rotation step corresponds to a period in which a preparatory operation before the image forming step, from input of the start instruction until image formation is actually started is performed. The sheet interval step (recording material interval step, image interval step) corresponds to a period corresponding to a timing between a recording material P and a subsequent recording material P when the images are continuously formed on the plurality of recording materials P (continuous image formation). The post-rotation step corresponds to a period in which a post-operation (preparatory operation) after the image forming step is performed. During non-image formation (non-image forming period) corresponds to a period other than during image formation and includes the above-described pre-rotation step, sheet interval step, and post-rotation step, and further a pre-multi-rotation step which is a preparatory step during turning-on of a power source (main switch) of the image forming apparatus 100 or during restoration from a sleep state.

<Outline of Control of Secondary Transfer Voltage>

Next, an outline of control of the secondary transfer voltage in this embodiment will be described.

As shown in FIG. 1, the secondary transfer power source 21 is connected to the secondary transfer roller 20, and a secondary transfer voltage outputted from the secondary transfer power source 21 is supplied to the secondary transfer roller 20. By applying the secondary transfer voltage from the secondary transfer power source 21 to the secondary transfer roller 20, an electric field is formed between the secondary transfer roller 20 and the secondary transfer opposite roller 13 provided at an opposing portion to the secondary transfer roller 20, so that the toner image is transferred from the intermediary transfer belt 10 onto the recording material P.

As shown in FIG. 2, the secondary transfer controller 202 includes a current detecting portion (ammeter) 241 as a current detecting means for detecting a current flowing through the secondary transfer portion N2 (secondary transfer roller 20) under application of the voltage from the secondary transfer power source 21 to the secondary transfer roller 20. The secondary transfer controller 202 is capable of controlling a voltage value outputted by the secondary transfer power source 21 so that the current flowing through the secondary transfer portion N2 becomes substantially constant at a target current value (approaches a target value). During the image formation (during secondary transfer), the current flowing through the secondary transfer portion N2 is detected in a predetermined cycle period (current detecting cyclic period) by the current detecting portion 241. Then, in the secondary transfer controller 202, a voltage value of the secondary transfer voltage applied to the secondary transfer roller 20 in a subsequent current detecting cyclic period is determined. The secondary transfer controller 202 determines the voltage value of the secondary transfer voltage in the subsequent current detecting cycle period by feeding back, to the secondary transfer power source 21, a difference between a preset target current value and a detection current value, which is an actual output value and which is detected by the current detecting portion 241. That is, the voltage value of the secondary transfer voltage applied to the secondary transfer roller 20 in the subsequent detecting cycle period is controlled so that the detection current value approaches the target current value. By this, the secondary transfer voltage applied from the secondary transfer power source 21 to the secondary transfer roller 20 is controlled so that the current flowing through the secondary transfer portion N1 becomes substantially constant. Herein, control such that the secondary transfer voltage is applied from the secondary transfer power source 21 to the secondary transfer power source 21 to the secondary transfer roller 20 so that the current value detected by the current detecting portion 241 becomes substantially constant at the preset predetermined current value is referred to as "constant-current control".

On the other hand, as shown in FIG. 2, the secondary transfer controller 202 includes a voltage detecting portion 242 as a voltage detecting means for detecting a voltage value applied from the secondary transfer power source 21 to the secondary transfer roller 20. The secondary transfer controller 202 is capable of carrying out control so that the voltage value outputted by the secondary transfer power source 21 becomes substantially constant at a target voltage value (approaches a target value). Incidentally, the voltage detecting portion 242 may detect (recognize) the voltage value from an indicated value of an output voltage value to the secondary transfer power source 21. In a high-temperature/high-humidity environment or the like, the recording material P, the secondary transfer roller 20, and the intermediary transfer belt 10, and the like are lowered in electric resistance value by the influence of moisture absorption. In such a state, when the "constant-current control" of the secondary transfer voltage is carried out, an absolute value of the secondary transfer voltage necessary to output the target current value becomes small, and therefore, there is a possibility that an electric field necessary to transfer the toner onto the recording material P is not formed and thus improper transfer occurs. Therefore, in order to ensure a necessary minimum voltage for transferring the toner onto the recording material P, the secondary transfer is performed by "constant-voltage control". Herein, control such that the secondary transfer voltage which is substantially constant at the preset predetermined voltage value is applied from the secondary transfer power source 21 to the secondary transfer roller 20 (control in which an applied voltage is made substantially constant irrespective of the current value) is referred to as the "constant-voltage control".

In this embodiment, on the basis of detection results of the temperature sensor 301 and the humidity sensor 302 of the environmental sensor 3X), the CPU circuit portion 150 of the engine controller 210 calculates an absolute water content of an environment in which the image forming apparatus 100 is installed. Then, depending on the calculated absolute water content, the CPU circuit portion 150 determines whether the control of the secondary transfer voltage by the secondary transfer controller 202 is carried out through the "constant-current control" or the "constant-voltage control", and then provides an instruction to the secondary transfer controller 202. In this embodiment, the "constant-voltage control" of the secondary transfer voltage is carried out in the case where the absolute water content is 21.7 g/m$^3$ or more, and the "constant-current control" of the secondary transfer voltage is carried out in the case where the absolute water content is less than 21.7 g/m$^3$.

Incidentally, in this embodiment, even in the case where the absolute water content is less than 21.7 g/m$^3$, as described later, the constant-voltage control is carried out when the necessary minimum voltage for transferring the toner cannot be ensured. That is, a lower limit value is provided for setting the voltage value of the secondary transfer voltage, and in the case where the secondary transfer voltage is below the lower limit value when the constant-voltage control is carried out, the secondary transfer voltage is controlled so that the voltage value is made substantially constant at a target voltage value corresponding to a lower limit value thereof.

<Details of Control of Secondary Transfer Voltage>

As described above, when the constant-voltage value of the secondary transfer voltage is set at a high value more than necessary so as to permit the secondary transfer of the toner image even in the case where the resistance value of the recording material is lowered, the current flowing through the contact member also increases, so that energization deterioration of the contact member is caused to occur in some instances. As described above, the "contact member" is a member which contacts the recording material P simultaneously with secondary transfer roller 20 at the portion other than the secondary transfer portion N2 and which is provided on the side upstream or downstream of the secondary transfer portion N2. For example, when a large current flows through the fixing member as the contact member for a long time, deterioration of the member, such as the energization deterioration of the fixing member, is caused to occur, and finally, the resistance value of the fixing member remarkably fluctuates, so that there is a possibility that image defect occurs.

A feature of this embodiment is such that in a high temperature/high humidity environment in which the resistance value of the recording material P and the resistance value of the secondary transfer roller 20 are lowered, the constant-voltage value of the constant-voltage control for the secondary transfer voltage is determined in the following manner. First, a test current is caused to flow in the secondary transfer portion N2 (the secondary transfer roller 20 and the intermediary transfer belt 10) before the recording material P reaches the secondary transfer portion N2. Then, on the basis of a test current value and a voltage value of the voltage applied to the secondary transfer roller 20 when the test current is caused to flow in the secondary transfer portion N2, the following voltage values are determined. One is (i) a lower limit value of the secondary transfer voltage necessary to cause the current to flow through the toner image (hereinafter, this value is referred to as a "lower-limit voltage Vunder"). Another one is (ii) an upper limit value of the secondary transfer voltage for preventing a remarkable change in resistance value of the contact member due to the energization deterioration (hereinafter, this value is referred to as a "limit voltage Vlimit"). Finally, (iii) the lower-limit voltage Vunder and the limit voltage Vlimit are compared with each other, and a lower voltage is determined as a secondary transfer voltage (final secondary transfer voltage) V. Then, this determined secondary transfer voltage V is applied to the secondary transfer roller during the secondary transfer of the toner image onto the recording material P.

In the following, with reference to a flowchart of FIG. 3, a flow of control of the secondary transfer voltage from a start to an end of the print job will be described. Further, a "lower-limit voltage determining step", a "limit voltage determining step", a "sheet interval voltage determining step", and the like, which are steps in the flow of FIG. 3 described later will be described with reference to FIGS. 4 to 6.

Figure 3:
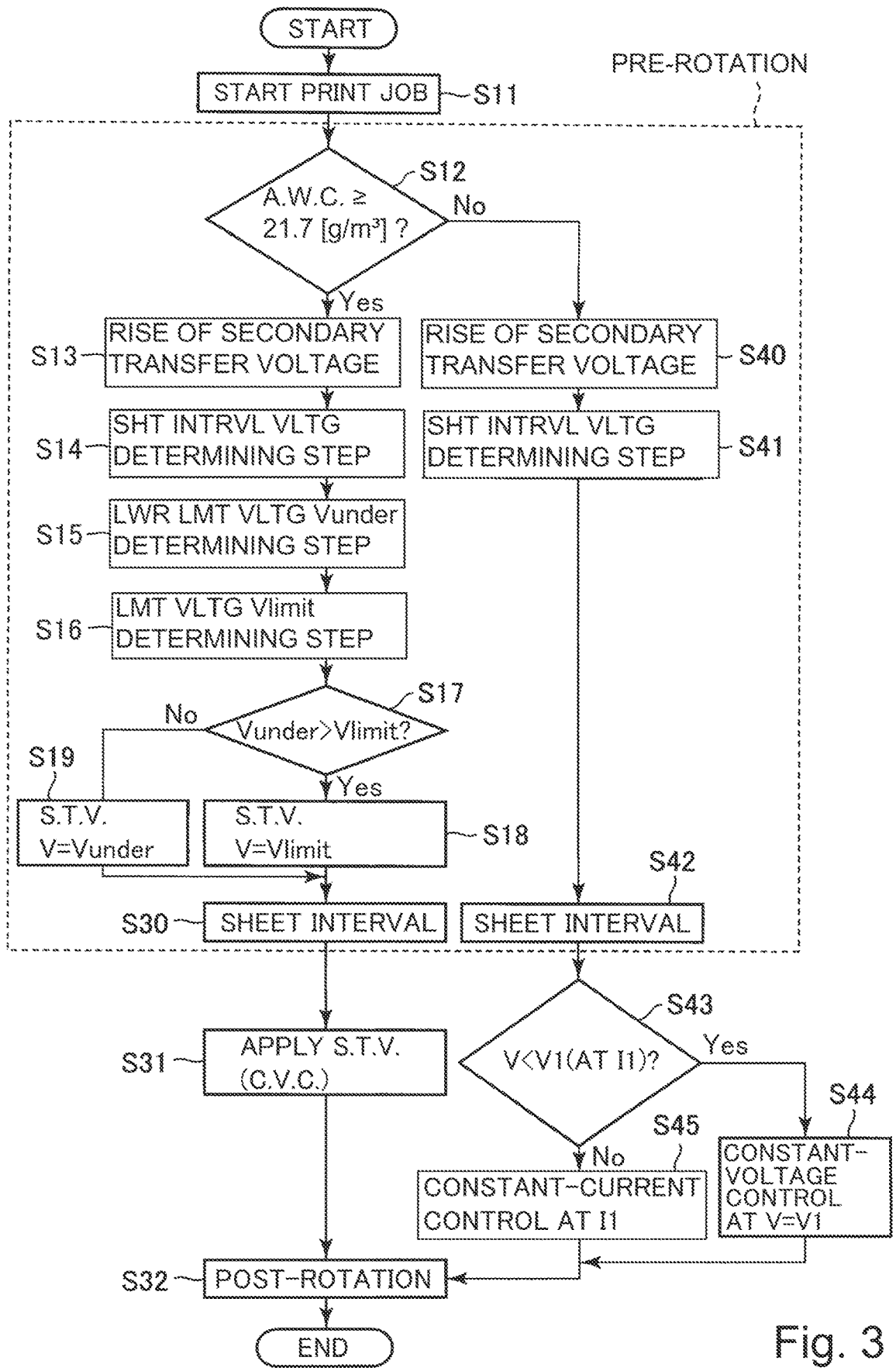
FIG. 3 is a flowchart of control of a secondary transfer voltage in an embodiment 1.

FIG. 3 is a flowchart showing control of the secondary transfer voltage from the start to the end of the print job in this embodiment (in this embodiment, a print job in which an image is formed on a single recording material is described as an example). The control of the secondary transfer voltage is roughly divided into three steps consisting of the pre-rotation step before the recording material P reaches the secondary transfer portion N2, the image forming step (print step) in which the toner image is secondary-transferred onto the recording material P, and the post-rotation step after the secondary transfer. Further, the pre-rotation step in this embodiment is divided into rise of a high voltage (secondary transfer voltage), determination of a sheet interval voltage Vt0, determination of the lower-limit voltage Vunder, determination of the limit voltage Vlimit, determination of the secondary transfer voltage V, and sheet interval control. Incidentally, for convenience, control (described later) in which the sheet interval voltage is applied before the image forming state in which the image is formed first on the recording material P in the print job is also referred to as the "sheet interval control". Particularly, determination of the secondary transfer voltage V based on the lower-limit voltage Vunder and the limit voltage Vlimit is a feature of this embodiment.

Figure 4:
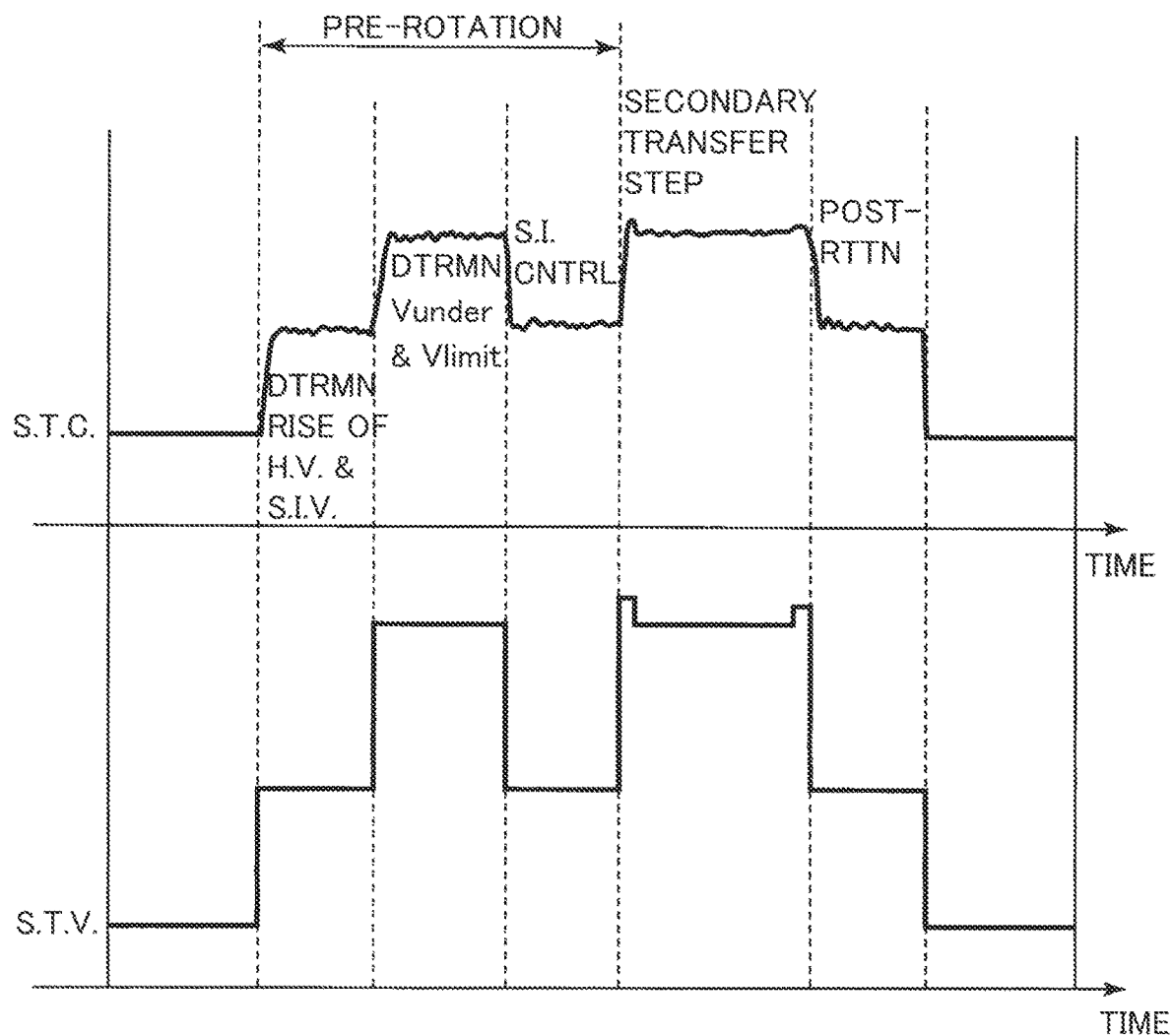
FIG. 4 is a time chart showing progression of each of a current and a voltage in the control of the secondary transfer voltage.

The engine controller 210 starts the print job when it receives a start instruction of the print job (S11). Then, first, the controller 210 calculates an environmental (ambient) absolute water content from environmental information acquired by the environmental sensor 300, and then discriminates whether or not the calculated absolute water content is 21.7 g/m$^3$ or more (S12). In the case where the controller 210 discriminated in S12 that the absolute water content is less than 21.7 g/m$^3$, the controller 210 determines that the control of the secondary transfer voltage is made the constant-current control and causes the sequence to go to processing of S40. Further, in the case where the controller 210 discriminated in S12 that the absolute water content is 21.7 g/m$^3$ or more, the controller 210 determines that the control of the secondary transfer voltage is made the constant-voltage control and causes the sequence to go to processing of S13. Even in the case where either of the constant-current control and the constant-voltage control is carried out, the controller 210 performs the rise of the high voltage (S13, S40) and the sheet interval determining step (S14, S41) (FIG. 4).

The rise of the high voltage is a step in which the constant-current control at a predetermined current It0 (20 µA in this embodiment) is carried out and for stably driving the secondary transfer power source 20. In the rise of the high voltage, the high voltage is raised by coarse adjustment control from a start voltage of 500 V to the vicinity of the predetermined current It0, and thereafter, fine adjustment control is carried out. The coarse adjustment control is carried out until a current change amount converges to a predetermined threshold (2 µA in this embodiment) after an output of the secondary transfer power source 21 is changed with a predetermined control cyclic period of 20 msec and a predetermined voltage change amount (100 V in this embodiment). After the coarse adjustment control converges, in the fine adjustment control, the output of the secondary transfer power source 21 is changed with the predetermined control cyclic period of 20 msec and a predetermined voltage change amount (20 V in this embodiment), and then the fine adjustment control is carried out until the current change amount converges to a predetermined threshold (0.8 µA in this embodiment). In the above-described manner, the controller 210 raises the high voltage so that the current becomes the predetermined current It0 (20 μA) (S14, S40).

After the rise of the high voltage, the controller 210 determines the sheet interval voltage Vt0 applied in subsequent sheet interval control (S30, S42). This step is referred to as the "sheet interval voltage determining step". In the sheet interval determining step, the controller 210 carries out the constant-current control at the predetermined current It0 for a predetermined time (1000 ms in this embodiment). Then, the controller 210 calculates an average voltage value Vt0 during the constant-current control at the predetermined current It0 by sampling the voltage value with a predetermined sampling cyclic period (20 ms in this embodiment). The controller 210 determines, as the sheet interval voltage, the average voltage value Vt0 calculated in this control, and then completes the sheet interval voltage determining step (S14, S41).

In the case where the constant-voltage control of the secondary transfer voltage is carried out after the above-described rise of the high voltage and the above-described sheet interval voltage determining step, the controller 210 causes the sequence to go to processing in which the secondary transfer voltage V applied during the secondary transfer of the toner image is determined (S15 to S19). In the following, first, a flow in the case of the constant-voltage control of the secondary transfer voltage V will be described.

First, the controller 210 determines the lower-limit voltage Vunder (S15). This step is the "lower-limit voltage determining step". The lower-limit voltage determining step is a step in which the current value of the current flowing through the toner image changes depending on the resistance value of the recording material P, and therefore, the lower-limit voltage Vunder which is the lower limit value of the secondary transfer voltage for suppressing the influence on the resistance value of the recording material P on a transfer property is determined. The lower-limit voltage determining step is a step for the purpose of determining a set voltage value for ensuring a divided voltage exerted on the toner on the recording material P in a certain amount irrespective of resistance values of the recording material P and the secondary transfer roller 20. For that reason, in the lower-limit voltage determining step, even on the recording material P low in resistance value such as on moisture-absorbing paper, a range of the lower-limit voltage Vunder for efficiently transferring the toner image is set.

In the lower-limit voltage determining step, the controller 210 raises the high voltage so that a current, which is a test current determined in advance, with a target current value Iunder in the lower-limit voltage determining step (hereinafter, this value is referred to as a "lower-limit voltage current value Iunder") flows (FIG. 4). The lower-limit voltage current value Iunder is determined in advance depending on a print mode, a paper (sheet) kind, a paper (sheet) size, or the like. Further, a set range of the lower-limit voltage Vunder is determined in advance depending on the print mode, the sheet kind, the surface size, or the like. A setting lower limit of the lower-limit voltage Vunder is "Vunder-min", and a setting upper limit of the lower-limit voltage Vunder is "Vunder-max". In the case where a secondary transfer voltage V' for causing the current with the lower-limit voltage current value Iunder to flow falls within a set range of the lower-limit voltage Vunder (Vunder-min≤V'≤Vunder-max), the controller 210 determines the secondary transfer voltage V' as the lower-limit voltage Vunder, and ends the lower-limit voltage determining step. Further, in the case where the secondary transfer voltage V' after the rise of the high voltage in which the lower-limit voltage current value Iunder is a target is less than the set range of the lower-limit voltage Vunder (V'<Vunder-min), the controller 210 determines Vunder-min as the lower-limit voltage Vunder, and ends the lower-limit voltage determining step. Further, in the case where the secondary transfer voltage V' after the rise of the high voltage in which the lower-limit voltage current value Iunder is the target is larger than the set range of the lower-limit voltage Vunder (V'>Vunder-max), the controller 210 determines Vunder-max as the lower-limit voltage Vunder, and ends the lower-limit voltage determining step. Incidentally, Vunder-min is set in advance at a value so that a transfer property of an "isolated patch pattern" on the moisture-absorbed recording material P falls under a tolerable range. Here, the "isolated patch pattern" means an image pattern such that a cluster of high print-ratio toner images is interspersed in a width of the recording material P (in a length with respect to a widthwise direction substantially perpendicular to the feeding direction). Further, Vunder-min is set in advance at a value at which insufficient transfer does not occur for an overall half-tone image or an overall solid image (overall solid black pattern) on the moisture-absorbed recording material P. Here, the "half-tone image" means an image pattern such that the toner image with a half-tone density level is present over the entirety of an image formable region with respect to the widthwise direction of the recording material P. Further, the "overall solid image (overall solid black pattern)" means an image pattern such that the toner image with a maximum density level is present over the entirety of the image formable region with respect to the widthwise direction of the recording material P.

As an example, in a table 1 below, setting of the lower-limit voltage Vunder for paper (sheet) of 75 g/m$^2$ in basis weight in this embodiment is shown.

TABLE 1

| ITEM | PAPER SIZE (WIDTH) | | | |
| --- | --- | --- | --- | --- |
| | <A5 | A5 | A4 | LTR≤ |
| Iunder | 50 μA | 55 μA | 60 μA | 80 μA |
| Vunder_min | 650 V | 700 V | 750 V | 850 V |
| Vunder_max | 750 V | 800 V | 850 V | 1100 V |

With an increasing width of the recording material P (paper width size), an area of a white background portion of the recording material P from which the secondary transfer current escapes and where there is no toner increases (i.e., an apparent resistance value of the recording material P lowers). For that reason, in order to permit sufficient supply of the transfer current to the toner, the lower-limit voltage current value Iunder is set at a high value in consideration of an escape (run-out) current.

The controller 210 completes the lower-limit voltage determining step as described above (S15).

Then, the controller 210 determines the limit voltage Vlimit (S16). This step is the "limit voltage determining step". The limit voltage determining step aims at setting the limit voltage Vlimit which is an upper limit of the secondary transfer voltage in order to suppress the energization deterioration of the contact member for the reason described later.

In the high temperature/high humidity environment on the like, the recording material P absorbs moisture and is lowered in resistance. In this state, when the recording material P contacts the contact member while being nipped in the transfer portion N2, the secondary transfer current flows through not only the secondary transfer opposite roller 13 which is an opposite roller to the secondary transfer roller 20 but also the contact member through the recording material P lowered in resistance. Basically, on a feeding (conveying) passage for the recording material P, only an insulating member (or a member high in resistance value) is provided so as to contact the recording material P in order that the secondary transfer current is prevented from flowing into the contact member. However, when the recording material P is lowered in resistance by the moisture absorption and the secondary transfer roller 20 is also lowered in resistance in the high temperature/high humidity environment, a part of the secondary transfer voltage is divided by (applied to) the contact member constituted by the insulating member or the like. As a result of an experiment by the present inventors, it turned out that when use of the image forming apparatus 100 is continued in a state in which a voltage value thereof is high, the contact member causes the energization deterioration, whereby the resistance value of the contact member lowers in some instances.

When the resistance value of the contact member lowers, the secondary transfer current flows through the recording material P, and a sufficient transfer current cannot be supplied to the toner, so that the image defect is caused to occur in some cases. Therefore, the upper limit (limit voltage Vlimit) is provided to the secondary transfer voltage, so that the voltage divided by the contact member is prevented from becoming a certain voltage or more, and thus the energization deterioration of the contact member is suppressed. Incidentally, from the viewpoint of protection of the power source or the like, the limit voltage Vlimit may preferably be less than an output limit voltage determined from a high-voltage element of the image forming apparatus 100.

The voltage divided by the contact member is determined by the resistance values of the secondary transfer roller 20 and the intermediary transfer belt 10. That is, the current value of the current flowing during the constant-current control fluctuates depending on the resistance values of the secondary transfer roller 20 and the intermediary transfer belt 10, and the current flows in a larger amount with a lower resistance value, so that the voltage divided by the contact member becomes high. For that reason, in this embodiment, the limit voltage Vlimit is not set at a certain value but is set depending on the resistance value of the secondary transfer portion N2. Therefore, in this embodiment, the limit voltage Vlimit is determined in the following manner.

In this embodiment, the lower-limit voltage determining step is performed without causing superfluous downtime (period in which the image cannot be formed) by utilizing a mechanism thereof (see FIG. 4). First, the controller 210 calculates a resistance value R of the secondary transfer portion N2 on the basis of the lower-limit voltage current value Iunder and the applied voltage value Vunder in the lower-limit voltage determining step. Specifically, the controller 210 calculates the resistance value R of the secondary transfer portion N2 on the basis of the following formula (1).

$$\text{Resistance value } R \text{ of secondary transfer portion } N2) = V\text{under}/I\text{under} \qquad \text{(formula (1))}$$

Incidentally, in the case where the output voltage when the current with the lower-limit voltage current value Iunder is caused to flow is less than Vunder_min or is larger than Vunder_max, the resistance value R of the secondary transfer portion N2 is calculated on the basis of the following formula (2) or formula (3), respectively.

$$\text{(Resistance value } R \text{ of secondary transfer portion } N2) = V\text{under\_min}/I\text{under\_min} \qquad \text{formula (2)}$$

$$\text{(Resistance value } R \text{ of secondary transfer portion } N2) = V\text{under\_max}/I\text{under\_max} \qquad \text{formula(3)}$$

In the formulas (2) and (3), Iunder_min and Iunder_max are current values when Vunder_min and Vunder_max are outputted, respectively.

The controller 210 calculates the resistance value R of the secondary transfer portion N2 by the formulas (1) to (3), and then determines the limit voltage Vlimit depending on the calculated resistance value R of the secondary transfer portion N2. A determining method of the limit voltage Vlimit depending on the resistance value R of the secondary transfer portion N2 will be described using FIG. 5 and FIG. 6.

Figure 5:
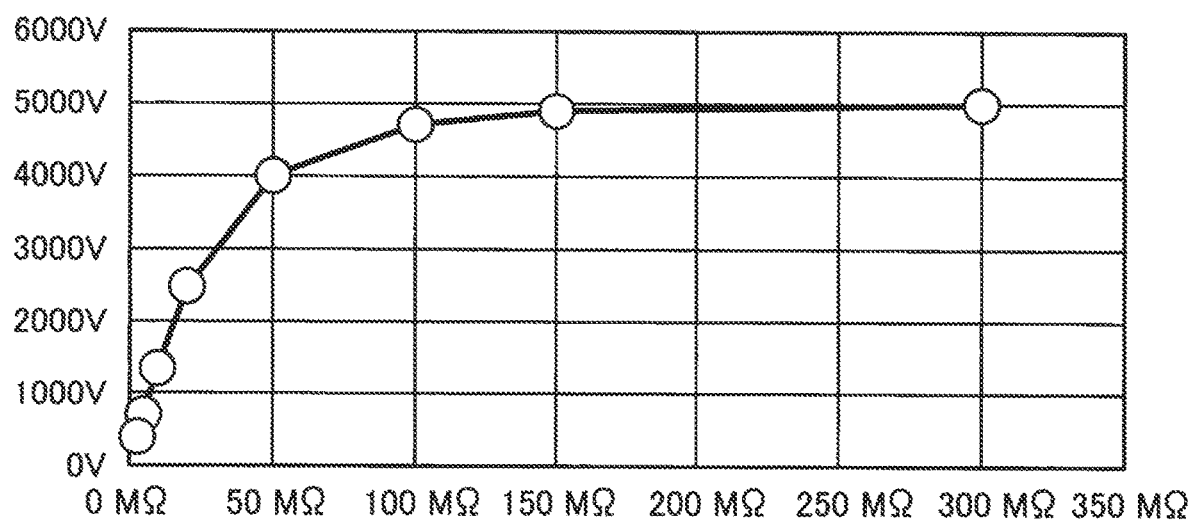
FIG. 5 is a graph showing a relationship between a resistance value of a secondary transfer portion and a limit voltage.

First, the determining method of the limit voltage Vlimit will be described using FIG. 5. Information indicating a relationship between the resistance value R of secondary transfer portion N2 and the limit voltage Vlimit as shown in a table 2 below is stored in advance in the ROM 151. The controller 210 determines the limit voltage Vlimit corresponding to the calculated resistance value R of the secondary transfer portion N2 by making reference to this information. The information indicating the relationship between the resistance value R of the secondary transfer portion N2 and the limit voltage Vlimit is acquired in advance on the basis of design data, experimental data, and the like so that a voltage divided by the contact member depending on the resistance value R of the secondary transfer portion N2 does not become a certain level or more. FIG. 5 is a graph showing the relationship between the resistance value R of the secondary transfer portion N2 and the limit voltage Vlimit shown in the table 2. In FIG. 5, the abscissa represents the resistance value R of the secondary transfer portion N2 calculated on the basis of the formula (1) from the lower-limit voltage current value Iunder and the lower-limit voltage Vunder, and the ordinate represents the limit voltage Vlimit depending on the resistance value R of the secondary transfer portion N2. Incidentally, in this embodiment, the limit voltage Vlimit at the resistance value R of the secondary transfer portion N2 which is not shown in the table 2 is determined by linear interpolation as shown in FIG. 5.

TABLE 2

| RESISTANCE R*1 | LIMIT VOLTAGE Vlimit |
| --- | --- |
| 3 MΩ | 400 V |
| 5 MΩ | 700 V |
| 10 MΩ | 1350 V |
| 20 MΩ | 2500 V |
| 50 MΩ | 4000 V |
| 100 MΩ | 4700 V |
| 150 MΩ | 4900 V |
| 300 MΩ | 5000 V |

*1"RESISTANCE R" is the resistance value R of the secondary transfer portion N2.

This relationship between the resistance value R of the secondary transfer portion N2 and the limit voltage Vlimit changes depending on a constitution or the like of the image forming apparatus 100. In the constitution of this embodiment, the insulating PFA tube of the surface of the fixing roller 31 is the contact member constituted by the insulating member to which the recording material P is contacted during the secondary transfer, and the limit voltage Vlimit is determined so that the insulating PFA tube does not cause the energization deterioration.

Next, by using parts (a) and (b) of FIG. 6, a mechanism of the change in voltage divided by the contact member (the insulating PFA tube of the fixing roller 31 in this embodiment) depending on the resistance value R of the secondary transfer portion N2 will be described. Part (a) of FIG. 6 is a schematic sectional view of the secondary transfer portion N2 and the fixing device 30 of the image forming apparatus 100, and part (b) of FIG. 6 shows a simple equivalent circuit thereof.

Part (a) of FIG. 6 shows a state in which the recording material P contacts the fixing roller 31 of the fixing device 30 while being nipped and fed in the secondary transfer portion N2. When the resistance value of the recording material P is sufficiently high compared with the resistance values of the transfer roller 20 and the intermediary transfer belt 10, the secondary transfer current flows along a passage of the secondary transfer roller 20, the intermediary transfer belt 10, the secondary transfer opposite roller 13, and the ground in the named order. Incidentally, the secondary transfer opposite roller 13 is electrically grounded. However, when the resistance value of the recording material P lowers to the same degree as those of the secondary transfer roller 20, the intermediary transfer belt 10, and the like, the secondary transfer current flows along the recording material P. For that reason, even in the case where the resistance value of the recording material P lowers, the pressing roller 32 is electrically grounded through the resistance element 34 (1000 MΩ) so that the secondary transfer current does not flow into the ground in a large amount through the fixing roller 31 and the like. Similarly, the fixing roller 31 which is the other passage is electrically grounded through the resistance element 33 (470 kΩ). By this, an overcurrent is suppressed.

The above-described constitution represented by a simple equivalent circuit is shown in part (b) of FIG. 6. In part (b) of FIG. 6, "R"s represent resistance values of respective members as shown below.

$R_{roller}$: resistance value of secondary transfer roller 20 ($10^6$Ω to $10^7$Ω in high temperature/high humidity environment)

$R_{belt}$: resistance value of intermediary transfer belt 10 ($10^6$Ω to $10^7$Ω in high temperature/high humidity environment)

$R_{oppst}$: resistance value of secondary transfer opposite roller 13 ($10^4$Ω to $10^5$Ω)

$R_{press}$: resistance value of pressing roller 32 ($10^4$Ω to $10^5$Ω)

$R_{insPFA}$: resistance value of insulating PFA tube of surface of fixing roller 31 ($10^{12}$Ω to $10^{13}$Ω)

$R_{elast}$: resistance value of elastic layer of inner surface of fixing roller 31 ($10^6$Ω to $10^7$Ω)

$R_{r.m.}$: resistance value of recording material P ($10^6$Ω to $10^7$Ω assumed in case of sufficient humidity absorption)

Further, in part (b) of FIGS. 6, P1 to P3 and $V_{p1}$ to $V_{p3}$ represent voltages and potentials of respective members as shown below.

P1: core metal voltage $V_{p1}$ of secondary transfer roller 20 (secondary transfer voltage)

P2: surface potential $V_{p2}$ of secondary transfer roller 20

P3: surface potential $V_{p3}$ of insulating PFA tube of surface of fixing roller 31

When the voltage $V_{p1}$ is applied from the secondary transfer power source 21, the potential of the core metal P1 of the secondary transfer roller 20 is a potential $V_{p1}$ which is substantially same as the voltage $V_{p1}$. At the surface P2 of the secondary transfer roller 20, the potential thereof becomes a potential $V_{p2}$ obtained by subtracting, from the core metal potential $V_{p1}$, a dropped voltage corresponding to the resistance value $R_{roller}$ of the secondary transfer roller 20. When the secondary transfer voltage $V_{1p1}$ is assumed to be constant as during the constant-voltage control, the potential $V_{p2}$ becomes small because the dropped voltage becomes larger with a higher resistance value of the secondary transfer roller 20, and becomes large because the dropped voltage becomes smaller with a lower resistance value of the secondary transfer roller 20. On the pressing roller 32 side downstream of the recording material P, the resistance element 34 (1000 MΩ) is provided and is electrically grounded, and on the fixing roller 31 side downstream of the recording material P, the resistance element 33 (470 kΩ) is provided and is electrically grounded, whereby the overcurrent is suppressed. Accordingly, the resistance value is lowered by moisture absorption of the recording material P, and if the lowered resistance value is assumed to become a negligible level, the surface potential $V_{p2}$ of the secondary transfer roller 20 substantially becomes the surface potential $V_{p3}$ of the insulating PFA tube of the surface P3 of the fixing roller 31 as it is. In actuality, the recording material P also has a resistance value to some extent, so that although $V_{p2} > V_{p3}$ holds, a difference between $V_{p2}$ and $V_{p3}$ becomes smaller with a lower resistance value of the recording material P.

Accordingly, when the resistance value of the secondary transfer roller 20 changes, the surface potential $V_{p2}$ of the secondary transfer roller 20 also changes, with the result that the voltage applied to the insulating PFA tube of the surface of the fixing roller 31 as the contact member also changes. In the case where the secondary transfer voltage is constant as during the constant-voltage control, the potential $V_{p2}$ at the surface P2 of the secondary transfer roller 20 becomes higher with a lower resistance value of the secondary transfer roller 20, and the potential $V_{p3}$ at the surface P3 of the fixing roller 31 becomes high with a lower resistance value of the recording material P.

In the high temperature/high humidity environment, both the secondary transfer roller 20 and the recording material P lower in resistance value due to the moisture absorption, and therefore, there is a possibility that the surface potential $V_{p3}$ of the fixing roller 31 is in a high state. In this state, if use of the image forming apparatus was continued, there was a case that the fixing roller 31 caused the energization deterioration and thus the resistance value changed. Therefore, in this embodiment, in order to suppress the energization deterioration by controlling the surface potential $V_{p3}$ of the fixing roller 31, the limit voltage Vlimit of the secondary transfer voltage is determined so as to made smaller with a lower resistance value of the secondary transfer roller 20.

Incidentally, in an actual image forming apparatus 100, the resistance value $R_{roller}$ of the secondary transfer roller 20 alone cannot be measured. Therefore, in this embodiment, the resistance value R of the secondary transfer portion N2 (principally, the sum of the resistance value of the secondary transfer roller 20 and the resistance value of the intermediary transfer belt 10) correlating with the resistance value of the secondary transfer roller 20 alone is measured in the lower-limit voltage determining step. Then, the limit voltage Vlimit is determined depending on the resistance value R of the secondary transfer portion N2.

Further, with a deceasing resistance value R of the secondary transfer portion N2, the secondary transfer current easily flows along the recording material P (there is a tendency that a potential difference $V_{p2}$-$V_{p3}$ between P2 and P3 becomes small). For that reason, the limit voltage Vlimit is made smaller with a lower resistance value R of the secondary transfer portion N2. Accordingly, a difference between the limit voltage Vlimit and the lower-limit voltage Vunder becomes smaller with a larger environmental (ambient) absolute water content and with a lower resistance value R of the secondary transfer portion N2. Further, as regards the current flowing along the recording material P, in accordance with the Ohm's law (the current is inversely proportional to the resistance value), sensitivity to a change in resistance value is larger with a lower resistance value R of the secondary transfer portion N2. For that reason, a change in limit voltage Vlimit relative to a change in resistance value R of the secondary transfer portion N2 becomes larger with a lower resistance value R of the secondary transfer portion N2.

The controller 210 completes the lower-limit voltage determining step by determining the limit voltage Vlimit depending on the resistance value R of the secondary transfer portion N2 in the above-described manner (S16).

The controller 210 determines the lower-limit voltage V under the limit voltage Vlimit, and then determines the secondary transfer voltage V (S17 to S19).

The secondary transfer voltage V is determined on the basis of the lower-limit voltage Vunder and the limit voltage Vlimit. First, the controller 210 compares magnitudes of the lower-limit voltage Vunder and the limit voltage Vlimit (S17). Specifically, the controller 210 discriminates whether or not the lower-limit voltage Vunder is higher than the limit voltage Vlimit (whether or not Vunder>Vlimit is satisfied).

Here, in the case where the lower-limit voltage Vunder is higher than the limit voltage Vlimit, when the lower-limit voltage Vunder is applied as the secondary transfer voltage, there is a possibility that the energization deterioration of the contact member (the insulating PFA tube of the fixing roller 31 in this embodiment) in the feeding passage of the recording material P is caused to occur. Accordingly, the controller 210 sets the secondary transfer voltage V at the limit voltage Vlimit in the case where the controller 210 discriminated in S17 that the lower-limit voltage Vunder is higher than the limit voltage Vlimit (S18).

On the other hand, in the case where the lower-limit voltage Vunder is the limit voltage Vlimit or less, even when the limit voltage Vunder is applied as the secondary transfer voltage, a possibility that the contact member (the 1o insulating PFA tube of the fixing roller 31 in this embodiment) in the feeding passage of the recording material P causes the energization deterioration is low. Accordingly, the controller 210 keeps the secondary transfer voltage V at the limit voltage Vunder in the case where the controller 210 discriminated in S17 that the lower-limit voltage Vunder is the limit voltage Vlimit or less (S19). The controller 210 determines the secondary transfer voltage V in the above-described manner.

The controller 210 carries out the sheet interval control after the secondary transfer voltage V is determined (S30). The sheet interval control aims at preparing for quickly applying a voltage with a desired value at a timing when the recording material P reaches the secondary transfer portion N2. The controller 210 prepares for the secondary transfer by applying the sheet interval voltage Vt0 determined in the lower-limit voltage determining step (S14). The above-described steps constitute the pre-rotation step before the recording material P reaches the secondary transfer portion N2.

Thereafter, the controller 210 carries out the constant-voltage control of the secondary transfer voltage at the timing when the recording material P reaches the secondary transfer portion N2, so that the secondary transfer of the toner image onto the recording material P is performed (S31). In the secondary transfer step, the secondary transfer voltage V determined in S18 or S19 is applied to the secondary transfer roller 20 through the constant-voltage control.

A leading end of the recording material P corresponds to a timing of rise of a high voltage from the sheet interval voltage and a timing when the recording material P gradually enters the secondary transfer portion N2 from an absence state of the recording material P and thus impedance becomes large. That is, a period from the application of the sheet interval voltage Vt0 to the application of the secondary transfer voltage V is an intermediary period of the rise of the high voltage, and in the period, the resistance value of the recording material P in the secondary transfer portion N2 is indefinite, and therefore, there is a possibility that a value of the voltage applied to the leading end of the recording material P becomes lower. For that reason, to the leading end (leading end portion, leading end region) of the recording material P, another voltage (leading end voltage) with a voltage value (constant-voltage value) which is not less than the secondary transfer voltage V during sheet (paper) passing may preferably be applied (see FIG. 4). Similarly, a trailing end of the recording material P corresponds to a timing when the recording material P passes through the secondary transfer portion N2 from a pressure state of the recording material P and thus the impedance abruptly becomes small. With this abrupt lowering in impedance, the secondary transfer voltage in the constant-voltage control does not follow, so that there is a possibility that the secondary transfer voltage becomes insufficient. For that reason, to the trailing end (trailing end portion, trailing end region) of the recording material P, similarly as in the leading end of the recording material, another voltage (trailing end voltage) with a voltage value (constant-voltage value) which is not less than the secondary transfer voltage during the sheet passing may preferably be applied (see FIG. 4).

In addition, a timing when the recording material P enters the fixing portion N3 is a timing when the insulating PFA tube of the surface of the fixing roller 31 is electrically charged, and at this timing, the secondary transfer current instantaneously flows toward the fixing portion N3 in some cases. For that reason, in order to interpolate a current flowing toward a portion other than the secondary transfer portion N2, at the timing when the recording material P enters the fixing portion N3, another voltage (fixing (portion) entrance voltage) with a voltage value (constant-voltage value) which is not less than the secondary transfer voltage V may preferably be applied in some instances. Incidentally, the leading end and the trailing end of the recording material P are those with respect to the feeding direction of the recording material P. Further, the "during (the) sheet passing" is a period in which the recording material P (specifically, the image formable region with respect to the feeding direction of the recording material P) is present in the secondary transfer portion N2. The "during the sheet passing" is a period corresponding to during image formation (during the secondary transfer) in the secondary transfer portion N2. As described later, as regards the leading end voltage, the trailing end voltage and the fixing entrance voltage which are described above, the limit voltage Vlimit can be set.

Next, a flow in the case where discrimination that the absolute water content is less than 21.7 g/m$^3$ is made in S12 and then the secondary transfer voltage is subjected to the constant-current control will be described. As described above, also, in this case, the fixing of the high voltage (S40), the sheet interval voltage determining step (S41), and the sheet interval step (S42) which are similar to those in the case where the secondary transfer voltage is subjected to the constant-voltage control are carried out. By this, the controller 210 prepares for quick control of the secondary transfer voltage at a desired current value with the timing when the recording material P reaches the secondary transfer portion N2. Then, when the recording material P reaches the secondary transfer portion N2, the controller 210 subjects the secondary transfer voltage to the constant-current control, so that the secondary transfer of the toner image onto the recording material P is carried out (S43 to S45).

First, on the basis of the print mode, the paper kind, the paper size, and the environmental information (temperature, humidity, absolute water content, and the like) acquired by the environmental sensor 300, the controller 210 makes reference to a target current value I1 from a table stored in the ROM 151 in advance. Then, the controller 210 discriminates whether or not the secondary transfer voltage V when subjected to the constant-current control with the target current value I1 is below a predetermined voltage V1 (S43). This is because the secondary transfer voltage V when subjected to the constant-current control with the target current value I1 is below the predetermined voltage V1 which is a necessary minimum voltage for transferring the toner (image) and thus an occurrence of improper transfer is suppressed. In the case where the controller 210 discriminated in S43 that the secondary transfer voltage V is below the predetermined voltage V1, the controller 210 subjects the secondary transfer voltage V to the constant-voltage control at the predetermined voltage V1 (S44), so that the toner image is secondary-transferred onto the recording material P. On the other hand, in the case where the controller 210 discriminated in S43 that the secondary transfer voltage V is not below the predetermined voltage V1 (i.e., the secondary transfer voltage V is the predetermined voltage V1 or more), the controller 210 subjects the secondary transfer voltage to the constant-current control at the target current value I1 as it is, so that the toner image is secondary-transferred onto the recording material P (S45). In this case, depending on the resistance value of the recording material P or a pattern of the toner image, the voltage value of the secondary transfer voltage fluctuates.

As described above, the image forming step (print step) is ended. Herein, the print job for forming the image on the single recording material P was described as an example, but in the case where the print job is continued, the sheet interval control and the secondary transfer step are alternately continued. In the case where the print job is ended, the controller 210 carries out the post-rotation step after the secondary transfer of the toner image onto the final recording material P (S32), and then ends the print job.

<Confirmation of Effect>

In order to confirm an effect of this embodiment, in the high temperature/high humidity environment (temperature: 30° C./relative humidity: 80% RH/absolute water content: 24.0 g/m$^3$), a durability test of 50000 sheets was conducted, and for each 10000 sheets, occurrence or non-occurrence of an image defect was verified. As the recording material P, paper ("XEROX Business 4200 Paper" (letter size (trade name), manufactured by Xerox Corp. (paper water content: 9.5%)) was used. The test was conducted for constitutions of this embodiment (embodiment 1), and a comparison example. Setting of the secondary transfer current and the secondary transfer voltage in the lower-limit voltage determining step and the limit voltage determining step in the constitution of this embodiment is setting for paper size of LTR or more in the above-described table 1. Incidentally, the paper water content was measured by using a microwave paper moisture meter ("Moistrex MX8000", manufactured by SHINMEI GENERAL CORP.).

Here, the constitution of the comparison example is similar to the constitution disclosed in JP-A 2010-191276. The constitution of the comparison example is similar to the constitution of this embodiment except that the control of the secondary transfer voltage is different from the control of the secondary transfer voltage in the constitution of this embodiment. Also, in the comparison example, elements corresponding to the elements of the constitution of this embodiment will be described by adding the same reference numerals or symbols as those for the associated elements in this embodiment. FIG. 7 is a flowchart showing a flow of the control of the secondary transfer voltage in the comparison example. In the constitution of the comparison example, the controller 210 starts the print job (S51), and thereafter, carries out the rise of the high voltage (S52), the sheet interval determining step (S53), and the sheet interval control (S54) which are similar to those in this embodiment without discriminating the ambient absolute water content. Thereafter, the controller 210 causes the image forming apparatus to perform the secondary transfer of the toner image onto the recording material P (S55 to S57). At this time, the controller 210 discriminates whether or not the secondary transfer voltage V when subjected to the constant-current control at a target current I2 is below a predetermined voltage V2 (S55). In the case where the controller 210 discriminated in S55 that the secondary transfer voltage V is below the predetermined voltage V2, the secondary transfer voltage is subjected to the constant-voltage control at the predetermined voltage V2 (S56). On the other hand, in the case where the controller 210 discriminated in S55 that the secondary transfer voltage V is not below the predetermined voltage V2 (i.e., the secondary transfer voltage V is the predetermined voltage V2 or more), the secondary transfer voltage is subjected to the constant-current control at the target current value I2 as it is (S57). Thereafter, the controller 210 causes the image forming apparatus to perform the post-rotation (S58), and then ends the print job.

A table 3 below is a table showing occurrence or non-occurrence of the image defect at the time of each of predetermined number of sheets subjected to the image formation in a durability test in the constitution of this embodiment (embodiment 1) and the constitution of the comparison example. In the table 3, "o" represents no occurrence of the image defect, and "x" represents the occurrence of the image defect. Incidentally, this durability test is ended at the time when the image defect occurred, and "-" in the table 3 represents that the durability test is not conducted.

TABLE 3

| | ($\times 10^3$ SHEETS) | | | | |
|---|---|---|---|---|---|
| | 10 | 20 | 30 | 40 | 50 |
| EMB. 1. | o | o | o | o | o |
| COMP. EX. | o | o | o | x | — |

In the constitution of the comparison example, the image defect did not occur until the time of $30 \times 10^3$ sheets subjected to the image formation.

However, in the constitution of the comparison example, at the time of 40×10³ sheets subjected to the image formation, the resistance value of the fixing roller 31 was lowered due to the energization deterioration of the fixing roller 31, and the image defect (the image defect due to improper transfer resulting from leakage of the secondary transfer current for each rotation cyclic period of the fixing roller 31) occurred.

On the other hand, in this embodiment, the voltage more than necessary was not divided onto the surface of the fixing roller 31, and therefore, the image defect did not occur through the durability test.

As described above, according to this embodiment, while maintaining a good secondary transfer property, durability deterioration of the contact member to which the recording material P contacts, simultaneously with the secondary transfer roller 20, at a portion other than the secondary transfer portion N2 can be suppressed. That is, according to this embodiment, while maintaining the good transfer property, it is possible to suppress image failure with deterioration of the contact member contacting the recording material simultaneously with the transfer member.

<Other Constitutions>

In this embodiment, the limit voltage determining step (S16) was performed after the lower-limit voltage determining step (S15), but the present invention is not limited thereto. In the reverse order to the above, the lower-limit voltage determining step (S15) may be performed after the limit voltage determining step (S16), and an effect similar to the effect of this embodiment can be achieved.

In this embodiment, in the case where the absolute water content is less than 21.7 g/m³, the lower-limit voltage determining step is not performed, but the present invention is not limited thereto. For example, even in the case where the absolute water content is less than 21.7 g/m³, it is preferable in some instances that the secondary transfer voltage V is determined (the limit voltage Vlimit is set) in a flow similar to the flow in this embodiment by performing the lower-limit voltage determining step. For example, it is possible to cite the case where use of a low-resistance recording material P, in the image formation sufficiently lower in resistance value than the secondary transfer roller 20 and the intermediary transfer belt 10 is grasped in some instances. For example, a user (operator) is capable of inputting, to the controller 210, information indicating that the low-resistance recording material P is used in the image formation by operating the host computer 199 or the operating portion provided on the image forming apparatus 100. The information may be information directly designating the low-resistance recording material P and may also be information designating a specific operation setting, such as an operation in a "low-resistance paper (sheet) mode", associated with the low-resistance recording material P. Depending on the information, the controller 210 is capable of determining the secondary transfer voltage V in a flow similar to the flow in this embodiment by performing the lower-limit voltage determining step. Incidentally, irrespective of the environment, depending on whether or not the low-resistance recording material P is used, the controller 210 may carry out control regardless of whether or not the limit voltage is set by performing the lower-limit voltage determining step. Here, even in the case where the secondary transfer voltage is subjected to the constant-current control, it is possible to set the limit voltage as an upper-limit voltage of the secondary transfer voltage.

An input means (input portion) for inputting, to the controller 210, the above-described information indicating the use of the low-resistance recording material P is not limited to one for inputting the information to the controller 210 depending on the operation by the user. Incidentally, the input means for inputting the information to the controller 210 in response to the operation by the user is, for example, an input/output portion for receiving a signal from the host computer, the operating portion of the image forming apparatus 100 operated by the operator, and the like. That is, means for detecting the use of the low-resistance recording material P in the image formation may be provided on the image forming apparatus 100. For example, a constitution in which information on the resistance value of the recording material P, such as a thickness or the resistance value of the recording material P, is acquired by a media sensor provided in the feeding passage of the recording material P from the feeding portion of the recording material P to the secondary transfer portion N2 can be employed. The media sensor, which is capable of being used for detecting or estimating a basis weight correlating with the thickness of the recording material P, and a surface property, a water content, and the like of the recording material P and which uses light, ultrasonic wave, or the like, has been known. Incidentally, the above-described information on the thickness of the recording material P is an example of the information on the recording material P. The information on the recording material P include any pieces of information capable of discriminating the recording material P, such as attributes (so-called paper kind category) based on general features, such as plain paper, thick paper, and thin paper, numerical values or numerical value ranges, such as the basis weight, the thickness, the size, and rigidity; or brands (including a manufacturer, a trade name, a product number, and the like). For each of the recording materials P distinguished by the information on the recording material P, the information on the recording material P can be regarded as constituting a kind of the recording material P. Further, information on the resistance value of the secondary transfer portion N2 including the recording material P is acquired by applying a test current or a test voltage to the secondary transfer portion N2 when the recording material P is present in the secondary transfer portion N2, and then from the acquired resistance value, the resistance value of the secondary transfer portion N2, which is acquired similarly as in this embodiment, is subtracted, so that the resistance value of the recording material P can be detected. In this case, for example, the resistance value of a first recording material P of the print job or the like is detected and can be referenced in control of the secondary transfer voltage during image formation of the toner image on a subsequent recording material P. Further, in a manner similar to the detecting method of the resistance value at the secondary transfer portion N2, a mechanism (an electroconductive roller pair, a power source, and the like) capable of detecting the resistance value of the recording material P may be provided in the feeding passage of the recording material P from the feeding portion of the recording material P to the secondary transfer portion N2.

In this embodiment, the resistance value R of the secondary transfer portion N2 is acquired on the basis of the above-described formula (1) (or the formula (2) or the formula (3)), but the present invention is not limited thereto. For example, a constitution in which the voltage Vt1 is applied to the secondary transfer opposite roller 13 and the secondary transfer is carried out with a potential difference between the secondary transfer voltage V and the secondary transfer opposite roller voltage Vt1 can be employed. In this case, the resistance value R of the secondary transfer portion N2 can be employed on the basis of the following formula (4).

(Resistance value R of secondary transfer portion
N2)=(Vunder−Vt1)/Iunder     formula (4)

That is, the formula (1) in this embodiment corresponds to the case where Vt1=0V holds in the formula (4) because the secondary transfer opposite roller 13 is connected to the ground, so that it is understood that the case based on the formula (4) can also achieve an effect similar to the effect of this embodiment. Similarly, the resistance value R of the secondary transfer portion N2 can be acquired on the basis of the following formulas (5) and (6) in place of the above-described formulas (2) and (3), respectively.

(Resistance value R of secondary transfer portion
N2)=(Vunder_min−Vt1)/Iunder_min     formula (5)

(Resistance value R of secondary transfer portion
N2)=(Vunder_max−Vt1)/Iunder_max     formula (6)

In this embodiment, the toner of which normal change polarity is the negative polarity is used, and therefore, each of Vunder and Vlimit is the voltage of the positive polarity. Accordingly, in S17 of FIG. 3, the magnitudes of these voltages are simply compared with each other, but the present invention is not limited thereto. In the case where the toner of which normal charge polarity is the positive polarity, each of Vunder and Vlimit becomes the voltage of the negative polarity. In this case, the magnitudes of absolute values of these voltages may only be required to be compared with each other. This is also true for high/low or the magnitudes of other voltages or potentials in this embodiment.

In this embodiment, when the limit voltage Vlimit is determined, the contact member constituted by the insulating member or the like on the feeding passage of the recording material P was cited as an example, but the present invention is not limited thereto. For example, in the case where the registration roller 60 (which is at least one of the registration roller pair 60 and 60) to which the recording material P contacts or in the like case, abrasion of the surface of the registration roller 60 is accelerated by the energization deterioration, so that there is a possibility that the influence is exerted on a feeding speed of the recording material P. For that reason, from the viewpoint of suppressing the abrasion of the registration roller 60, it is possible to apply the control of this embodiment. Further, to each of the fixing device 30 and the registration roller 60, control for setting the limit voltage Vlimit similar to the control in this embodiment is applied, so that the limit voltage Vlimit can be set for each of the fixing device 30 and the registration roller 60. Further, in this case, of the above-described set (determined) limit voltages Vlimit, a lower voltage (smaller in absolute value) may preferably be compared with Vunder. In addition, it would be considered that a mold component part or the like to which the recording material P contacts on the feeding passage of the recording material P lowers in resistance value due to energization deterioration thereof and the secondary transfer current flows through the mold component part. Accordingly, to the mold component part or the like, the control for setting the limit voltage Vlimit similar to the control in this embodiment can be applied.

In this embodiment, as regards the constant-voltage value during the sheet passing, Vunder and Vlimit were compared with each other, but the present invention is not limited thereto. Also, as regards the above-described leading end voltage, control similar to the control in this embodiment may be carried out by comparing the leading end voltage with Vlimit. That is, in this embodiment, the member which can cause the energization deterioration was the insulating PFA tube of the surface of the fixing roller 31, and therefore, a timing of contact with the recording material P simultaneously at the secondary transfer portion N2 and the fixing portion N3 was during the constant-voltage control during the sheet passing. However, as described above, in the case of the energization deterioration of the member to which the recording material P on the feeding passage can contact, the control for setting the limit voltage Vlimit similar to the control in this embodiment may also carried out for the leading end voltage. For example, the leading end of the recording material P enters the secondary transfer portion N2 while being nipped and fed by the registration roller pair 60 and 60. For that reason, the leading end voltage leads to the energization deterioration of the registration roller 60 in some cases. Therefore, as regards the voltages, such as the leading end voltage or the like, applied to the secondary transfer portion N2 at a timing when at least the recording material P contacts both the registration roller pair 60 and 60 and the secondary transfer portion N2 at the same time, it is preferable that limitation is applied to the voltage (Vlimit is set) by control similar to the control in this embodiment. Similarly, as regards the voltage, such as the above-described trailing voltage or the like, applied to the secondary transfer portion N2 at a timing when at least the recording material P contacts both the secondary transfer portion N2 and the fixing portion N3, limitation is applied to the voltage (Vlimit is set) by control similar to the control in this embodiment.

In this embodiment, in the case where the ambient absolute water content was 21.7 g/m$^3$ or more, control parameters (Iunder, Vunder_min, Vunder_max) of the control for setting the lower-limit voltage Vunder were set as shown in the table 1. However, the present invention is not limited thereto. For example, as shown in a table 4 below, the control parameters may be changed depending on the absolute water content. The table 4 shows control parameters of control for setting the lower-limit voltage Vunder for an LTR size (width). With a higher ambient absolute water content, a water content of the recording material P becomes larger. Accordingly, the resistance value of the recording material P also lowers, so that current escape to a portion (white background portion) other than the toner portion on the recording material P is liable to occur. For that reason, in order to suppress improper transfer by ensuring a transfer current to the toner portion, the transfer voltage (lower-limit voltage Vunder) may preferably be made higher with a higher ambient absolute water content as shown in the table 4.

TABLE 4

|  | ABSOLUTE WATER CONTENT | | |
| --- | --- | --- | --- |
| ITEM | 19.0 g/m$^3$ | 21.7 g/m$^3$ | 24.0 g/m$^3$ |
| Iunder | 70 μA | 80 μA | 90 μA |
| Vunder_min | 800 V | 850 V | 900 V |
| Vunder_max | 1050 V | 1100 V | 1150 V |

Thus, in this embodiment, the image forming apparatus 100 includes the image bearing member 10, the transfer member 20 for forming the transfer portion N2 in contact with the image bearing member 10 and for transferring the toner image from the image bearing member onto the recording material P passing through the transfer portion N2, the power source 21 for outputting the voltage to the transfer portion 20, the detecting portion 241 for detecting at least one of the current value of the current flowing through the transfer member 20 and the voltage value of the voltage applied to the transfer member 20 when the voltage is outputted from the power source 21 to the transfer member 20, the controller 210 for controlling the power source 21, the environment detecting portion 300 for detecting the environmental information on at least one of the ambient temperature and the ambient humidity, and the contact member provided contactable to the recording material P at the portion other than the transfer portion, simultaneously with the transfer member 20. Further, in the case where the absolute water content acquired on the basis of the above-described environmental information is the predetermined threshold or more, the controller 210 sets the limit voltage Vlimit on the basis of the detection result of the detecting portion 241 in the absent state of the recording material P in the transfer portion N2, and controls the power source 21 so that the absolute value of the voltage applied from the power source 21 to the transfer portion 20 becomes the absolute value or less of the limit voltage Vlimit during the contact with the transfer member 20 and the contact member 31 at the same time. Incidentally, the image forming apparatus 100 includes the input portion for inputting the information on the recording material P to the controller 210, and in the case where the information inputted through the input portion satisfies the predetermined condition, the controller 210 may carry out the control for setting the above-described limit voltage Vlimit. The input portion may also permit the above-described information to the controller 210 in response to the operation by the operator. Further, the above-described information may include the kind of the recording material P, the operation setting provided corresponding to the recording material P of the predetermined kind, or the information indicating the index value corresponding with the electric resistance value of the recording material P. Further, the input portion may be the sensor for inputting, as the information, the detection result of the index value correlating with the electric resistance value of the recording material P to the controller 210. Further, the above-described condition may be such that the electric resistance value of the recording material P in the case where the control for setting the limit voltage Vlimit is carried out is lower than the electric resistance value of the recording material P in the case where the control for setting the limit voltage Vlimit is not carried out. Further, in this embodiment, the absolute value of the limit voltage Vlimit is less than the absolute value of the output limit voltage determined from the characteristic of the high-voltage element of the above-described power source 21. In this embodiment, the image forming apparatus 100 includes, as the contact member, the fixing member 31 for fixing the toner image on the recording material P. Further, the fixing member 31 is electrically grounded through the resistance element. Further, the fixing member 31 includes the electrically insulating surface layer contactable to the recording material P. Further, in this embodiment, the above-described image-bearing member 10 is the intermediary transfer member for feeding the toner image, primary-transferred from another image bearing member 1, in order to secondary-transfer the toner image onto the recording material P in the transfer portion N2.

Further, the controller 210 is capable of setting the limit voltage Vlimit so that the limit voltage Vlimit, in the case where the electric resistance value of the transfer portion N2 indicated by the detection result of the detecting portion 241 is the first resistance value, is the first limit voltage and so that the limit voltage Vlimit, in the case where the electric resistance value is the second resistance value lower than the first resistance value, is the second limit voltage lower in absolute value than the first limit voltage. Further, the controller 210 is capable of setting the limit voltage Vlimit so that the limit voltage Vlimit, in the case where the electric resistance value of the transfer portion N2 indicated by the detection result of the detecting portion 241 is the first resistance value, is the first limit voltage, so that the limit voltage Vlimit, in the case where the electric resistance value is the second resistance value lower than the first resistance value by the predetermined value, is the second limit voltage lower in absolute value than the first limit voltage, so that the limit voltage Vlimit, in the case where the electric resistance value is the third resistance value lower than the second resistance value, is the third limit voltage lower in absolute value than the second limit voltage, so that the limit voltage Vlimit, in the case where the electric resistance value is the fourth resistance value lower than the third resistance value by the above-described predetermined value, is the fourth limit voltage lower in absolute value than the third limit voltage, and so that the difference between the third limit voltage and the fourth limit voltage is made larger than the difference between the first limit voltage and the second limit voltage. Further, in this embodiment, the limit voltage Vlimit is set so as to limit the voltage, of the voltage applied from the power source 20 to the transfer member 20, divided by the contact member 31 through the recording material P.

Further, in this embodiment, on the basis of the detection result of the detecting portion 241 in the absence state of the recording material P in the transfer portion N2, the controller 210 sets the lower-limit voltage Vunder indicating the lower limit value of the absolute value of the voltage applied from the power source 21 to the transfer member 20 during the transfer, and controls the power source 21 so that the voltage applied from the power source 21 to the transfer member 20 during the contact of the recording material P with the transfer member 20 and the contact member 31 at the same time is made the lower one in absolute value of the lower-limit voltage Vunder and the limit voltage Vlimit. The controller 210 is capable of setting the lower-limit voltage Vunder so as to be the first lower-limit voltage in the case where the absolute water content acquired on the basis of the above-described environmental information is the first water content and so as to be the second lower-limit voltage higher in absolute value than the first lower-limit voltage in the case where the absolute water content is the second water content larger than the first water content. Further, the controller 210 is capable of setting the lower-limit voltage Vunder so as to be the first lower-limit voltage in the case where the width with respect to the direction substantially perpendicular to the feeding direction of the recording material P is the first width and so as to be the second lower-limit voltage higher in absolute value than the first lower-limit voltage in the case where the width is the second width wider than the first width. Further, the controller 210 is capable of setting the lower-limit voltage Vunder and the limit voltage Vlimit so that the difference between the lower-limit voltage Vunder and the limit voltage Vlimit in the case where the absolute water content acquired on the basis of the above-described environmental information is the first water content is the first difference and so that the difference between the lower-limit voltage Vunder and the limit voltage Vlimit in the case where the absolute water content is the second water content larger than the first water content is the second difference smaller than the first difference.

Next, another embodiment of the present invention will be described. Basic constitution and operation of an image forming apparatus of an embodiment 2 are the same as those of the image forming apparatus of the embodiment 1. Accordingly, in the image forming apparatus of the embodiment 2, as regards elements having the same or corresponding functions and constitutions as those in the image forming apparatus of the embodiment 1, reference numerals or symbols which are the same as those in the embodiment 1 are added and detailed description thereof will be omitted.

In the embodiment 1, the lower-limit voltage Vunder and the limit voltage Vlimit were compared with each other, and the lower voltage therebetween was applied as the secondary transfer voltage V to the secondary transfer roller 20. A feature of this embodiment is in a control method in the case where the lower-limit voltage Vunder is corrected.

In this embodiment, description will be made in a manner such that the lower-limit voltage Vunder determined in the lower-limit voltage determining step similarly as in the embodiment 1 is distinguished from a lower-limit voltage Voffset obtained by subjecting the lower-limit voltage Vunder to correction.

FIG. 8 is a flowchart showing control of the secondary transfer voltage from the start to the end of the print job in this embodiment (in this embodiment, a print job in which an image is formed on a single recording material is described as an example). In a flow of FIG. 8, steps identical or corresponding to those in the flow of FIG. 3 described in the embodiment 1 will be appropriately omitted from detailed description by adding the same step numbers.

Similarly as in the embodiment 1 when the print job is started (S11), the controller 210 calculates an environmental (ambient) absolute water content from environmental information acquired by the environmental sensor 300, and then discriminates whether or not the calculated absolute water content is 21.7 g/m$^3$ or more (S12). Further, in the case where the absolute water content is less than 21.7 g/m$^3$, in order to subject the secondary transfer voltage to the constant-current control, the controller 210 causes the sequence to go to processing of S40, and in the case where the absolute water content is 21.7 g/m$^3$ or more, in order to subject the secondary transfer voltage to the constant-voltage control, the controller 210 causes the sequence to go to processing of S13. Further, similarly as in the embodiment 1, even in the case where either of the constant-current control and the constant-voltage control is carried out, the controller 210 performs the rise of the high voltage (S13, S40) and the sheet interval determining step (S14, S41).

In the case where the secondary transfer voltage is subjected to the constant-voltage control, the controller 210 then determines Vunder by the lower-limit voltage determining step (S15) and determined Vlimit by the limit voltage determining step (S16) similarly as in the embodiment 1. Incidentally, the order of S15 and S16 may be a reverse order.

Then, the controller 210 calculates, different from the embodiment 1, Voffset obtained by subjecting the limit voltage Vunder (S20 to S22). As described above in the embodiment 1, the lower-limit voltage determining step is the step for determining the voltage (lower-limit voltage Vunder) for suppressing the influence of the resistance value of the recording material P on the transfer property because the current value of the current flowing through the toner image changes depending on the resistance value of the recording material P. That is, the lower-limit voltage determining step aims at determining the voltage for improving the secondary transfer property irrespective of the state of the recording material P. Therefore, in addition to the state of the recording material P, when the correction is made so that the transfer property further becomes appropriate depending on the toner amount and an arrangement state, the value of the voltage becomes a voltage value higher in accuracy.

In this embodiment, as an example, a correcting method of the lower-limit voltage depending on the toner amount will be described. For description of a relationship between the toner amount and the secondary transfer property, the image defect occurring in the case where the isolated patch pattern is transferred onto the moisture-absorbed recording material P (hereinafter, referred to as a "patch void") will be described using FIG. 9. Part (a) of FIG. 9 is an example of an image including the isolated patch pattern, and part (b) of FIG. 9 is a schematic view of a cross section of the image including the isolated patch pattern in the secondary transfer portion N2. Here, as described above, the "isolated patch pattern" means the image pattern such that the cluster of the high print-ratio voltage images is interspersed in the lateral width of the recording material P.

In the high temperature/high humidity environment, the secondary transfer roller 20 and the recording material P absorb moisture and lower in resistance value. Accordingly, in the case where a low print-ratio image, which includes the isolated patch pattern or the like as shown in part (a) of FIG. 9 and of which toner amount in one page becomes small, is transferred, the following phenomenon occurs. That is, as shown in part (b) of FIG. 9, the transfer current is liable to selectively flow through a low-resistance portion where the toner T is not present (herein, referred to as a "white background portion"), not a high-resistance portion of the toner T (herein, referred to as a "toner portion (or patch portion)"). Further, the transfer current does not readily flow through the portion of the toner T (toner portion, patch portion). Incidentally, arrows in part (b) of FIG. 9 schematically represent a path of the secondary transfer current, and a thickness of the arrows schematically represents a magnitude of the current. In the constant-current control, the transfer current becomes insufficient and the isolated patch pattern cannot be sufficiently transferred, so that the "patch void" such that the toner (image) is not partially transferred and falls off is liable to occur. Accordingly, in order to suppress the patch void, it is preferable that, in consideration of an amount of escape of the transfer current to the white background portion, the secondary transfer voltage is set higher.

Thus, when the transfer voltage is determined depending on the toner amount, of the toner image transferred onto the recording material P, such as the toner amount in one page or the toner amount in the secondary transfer portion N2, it becomes possible to further accurately perform the secondary transfer. Accordingly, in this embodiment, the correction of the lower-limit voltage is made so that a correction amount ΔV is added to the lower-limit voltage Vunder in the case where the decrease in toner amount is grasped in advance (in the case where the toner amount is a predetermined threshold or less). That is, the controller 210 calculates the corrected voltage Voffset on the basis of the following formula (7).

$$V\text{offset}=V\text{under}+\Delta V ((\text{toner amount}) \leq X\%),$$

$$V\text{offset}=V\text{under} ((\text{toner amount}) > X\%) \quad \text{formula (7)}$$

Incidentally, in this embodiment, the controller 210 predicts, for example, the toner amount in one page from the number of times of light emission of a laser driving signal of the exposure device 3 generated by conversion from the image data. In this embodiment, the toner amount is determined in such a manner that the case where a whole-surface signal color image is printed on one page is 100%. In this embodiment, a threshold X % in the formula (7) was 20%.

The controller 210 determines the corrected lower-limit voltage Voffset as described above (S20 to S22).

Subsequently, on the basis of the corrected lower-limit voltage Voffset and the limit voltage Vlimit, similarly as in S17 to S19 of FIG. 3 in the embodiment 1, the controller 210 determines the secondary transfer voltage V (S17 to S19). That is, first, the controller 210 compares magnitudes of the corrected lower-limit voltage Voffset and the limit voltage Vlimit with each other (S17). Specifically, the controller 210 discriminates whether or not the corrected lower-limit voltage Voffset is higher than the limit voltage Vlimit (whether or not Voffset>Vlimit) is satisfied. Then, in the case where the corrected lower-limit voltage Voffset is higher than the limit voltage Vlimit, there is a possibility that the contact member causes the energization deterioration by continuous use thereof, and therefore, the controller 210 determines the limit voltage Vlimit as the secondary transfer voltage V (S18). On the other hand, in the case where the correlated lower-limit voltage Voffset is not less than the limit voltage Vlimit, the controller 210 determines the corrected lower-limit voltage Voffset as the secondary transfer voltage V (S19). The controller 210 determines the secondary transfer voltage V in the above-described manner.

Subsequent processes S30 to S32 in the case where the secondary transfer voltage is subjected to the constant-voltage control and processes S42 to S45 and S32 in the case where the secondary transfer voltage is subjected to the constant-current control are similar to the processes with the same step numbers, respectively, of FIG. 3 in the embodiment 1, and therefore, will be omitted from detailed description.

Thus, in this embodiment, the controller 210 sets the limit voltage Vlimit on the basis of the detection result of the detecting portion 241 in the absence state of the recording material P in the transfer portion N2 and the information on the toner amount of the toner used in the toner image.

As described above, according to this embodiment, it is possible to obtain the secondary transfer property further better than the secondary transfer property in the embodiment 1.

<Other Constitutions>

In this embodiment, the toner amount of the toner image transferred onto the recording material P was estimated from the number of times of light emission of the laser driving signal, but the present invention is not limited thereto. For example, image information (toner amount information) is sent together with a video signal from the controller 200 to the (engine) controller 210, and then the controller 210 may determine the correction value for the lower-limit voltage on the basis of the information.

Further, in this embodiment, the calculation of the toner amount was performed for one page, but the present invention is not limited thereto. For example, the correction may be made in an arbitrary cyclic period such as each one full-circumference of the secondary transfer roller 20 or each one-full-circumference of the photosensitive drum 1. It is preferable that the voltage value is changed depending on the toner amount of the secondary transfer portion N2, and therefore, in a state in which responsiveness of the secondary transfer power source is sufficiently fast, the secondary transfer voltage may be changed depending on the toner amount of the secondary transfer portion N2.

Further, in this embodiment, the correction amount for the lower-limit voltage applied to the secondary transfer roller 20 was determined on the basis of the toner amount, but the present invention is not limited thereto. For example, in a constitution in which the secondary transfer is performed by a potential difference between the secondary transfer voltage and the secondary transfer opposite roller voltage, the correction amount for the lower-limit voltage may be changed by changing the secondary transfer opposite roller voltage without correcting the voltage applied to the secondary transfer roller 20.

Next, another embodiment of the present invention will be described. In the image forming apparatus of an embodiment 3, as regards elements having the same or corresponding functions and constitutions as those in the image forming apparatuses of the embodiments 1 and 2, reference numerals or symbols which are the same as those in the embodiments 1 and 2 are added and detailed description thereof will be omitted.

The image forming apparatus of this embodiment is the image forming apparatus provided with no primary transfer power source. As a constitution in which the primary transfer power source is not provided, a drum voltage constitution described later in which primary transfer members are connected to the ground would be considered as an example. In this embodiment, the drum voltage constitution in which the primary transfer members are connected to the ground, an intermediary transfer belt used in the drum voltage constitution, and a functional effect in the case where the present invention is applied to the drum voltage constitution will be described.

First, the drum voltage constitution will be described. The image forming apparatus employing the drum voltage constitution in which the primary transfer members are connected to the ground refers to an image forming apparatus employing a high-voltage power source constitution as shown in FIG. 10. FIG. 10 is a schematic view showing a connection state and a grounding state of a high-voltage for respective portions around primary transfer portions N1 in the image forming apparatus 100 of this embodiment. In this embodiment, the primary transfer rollers 14 as the primary transfer members are connected to the ground (0 V) (electrically grounded). Further, in this embodiment, during image formation, to a core metal (not shown) of the photosensitive drum 1, a voltage of −300 V as a drum voltage (reference voltage) is applied from a high-voltage power source 200. On the surface of the photosensitive drum 1, an image forming potential V1 (−400 V) larger in absolute value than the drum voltage is formed. Then, by a difference (primary transfer contrast) between the potential (0 V) of the primary transfer roller 14 and the image forming potential V1 (−400 V) of the surface of the photosensitive drum 1, the toner on an image portion (portion of the image forming potential V1) of the photosensitive drum 1 is primary-transferred onto the intermediary transfer belt 10.

Next, the intermediary transfer belt 10 used in the drum voltage constitution will be described. As in this embodiment, in the constitution in which the primary transfer power source is not provided, it is difficult to increase the primary transfer contrast. In order to increase the primary transfer contrast, there is a need to increase the absolute value of the drum voltage, so that increases in size and cost of the image forming apparatus 100 are invited in some cases. For that reason, in order to cause a primary transfer current to flow sufficiently even in a small primary transfer contrast, it is preferable that an electric resistance of the intermediary transfer belt 10 is low.

FIG. 11 is a schematic view showing a cross-sectional structure of the intermediary transfer belt 10 in this embodiment. In this embodiment, as the intermediary transfer belt 10, an endless belt of 700 mm in circumferential length and 65 μm in thickness was used. Further, as shown in FIG. 11, in this embodiment, the intermediary transfer belt 10 has a two-layer structure consisting of a base layer 10e of 64 μm in thickness and an inner surface layer 10f of 1 μm in thickness. The intermediary transfer belt 10 contacts the photosensitive drum 1 on a base layer 10e side (outer peripheral surface side) and contacts the primary transfer roller 14 on an inner surface layer 10f side (inner peripheral surface side). In this embodiment, as a material of the base layer 10e, a polyethylene terephthalate (PET) resin material in which an ion-conductive agent is mixed as an electroconductive agent was used. Further, in this embodiment, as a material of the inner surface layer 10f, a polyester resin material in which carbon black which is an electron-conductive agent as the electroconductive agent is mixed was used. The inner surface layer 10f is formed inside the base layer 10e, and contacts the driving roller 11, the tension roller 12, and the secondary transfer opposite roller 13. Incidentally, in this embodiment, as the material of the base layer 10e, the polyethylene terephthalate (PET) resin material was used, but another material can also be used. As a material of the base layer 10e, for example, materials such as polyester and acrylonitrile-butadiene-styrene (ABS) copolymer, and a mixed resin material of these materials can be used. Further, in this embodiment, as the material of the inner surface layer 10f, the polyester resin material was used, but another material can also be used. For example, an acrylic resin material may also be used.

In this embodiment, compared with the electric resistance of the base layer 10e of the intermediary transfer belt 10, the electric resistance of the inner surface layer 10f is made low. In this embodiment, volume resistivity of the intermediary transfer belt 10 is $1 \times 10^{10}$ Ω·cm. Further, in this embodiment, surface resistivity of the inner surface of the intermediary transfer belt 10 is $1.0 \times 10^6$ Ω/□. In this embodiment, a measuring environment of an electric characteristic of the intermediary transfer belt 10 is a room temperature of 23° C. and a room humidity of 50% RH. In this embodiment, between the base layer 10e and the inner surface layer 10f, from a relationship between the electric resistance and the thickness, the electric resistance value of the base layer 10e is reflected in volume resistivity actually measured for the intermediary transfer belt 10. On the other hand, the electric resistance value of the inner surface layer 10f is reflected in surface resistivity actually measured for the inner surface of the intermediary transfer belt 10.

Incidentally, the volume resistivity was measured by using a measuring device ("Hiresta-UP (MCP-HI450)", manufactured by Mitsubishi Chemical Holdings Corp.) provided with a ring probe ("Type UR (mode: MCP-HTP12)"). Further, the surface resistivity was measured using the same device as the measuring device for the volume resistivity provided with a ring probe ("Type UR100 (model: MCP-HTP16)").

Measurement of the volume resistivity was measured under a condition such that the probe is applied to the intermediary transfer belt 10 from the outer surface side (base layer 10e side) and a voltage of 100 V is applied for 10 sec as a measuring time. Further, measurement of the surface resistivity was measured under a condition such that the probe is applied from the inner surface side (inner surface layer 10f side) and a voltage of 10 V is applied for 10 sec as a measuring time. In this embodiment, the volume resistivity of the intermediary transfer belt 10 may preferably be in a range of $1 \times 10^9$ Ω·cm or more and $1 \times 10^{10}$ Ω·cm or less, and the surface resistivity of the inner surface of the intermediary transfer belt 10 may preferably be in a range of $4.0 \times 10^6$ Ω/□ or less (typically, $1.0 \times 10^5$ Ω/□ or more).

The intermediary transfer belt 10 having the electric resistivity values as described above is low in electric resistance to the extent that the current is caused to flow through the intermediary transfer belt 10 in the circumferential direction, and therefore, even when the primary transfer contrast is small, the primary transfer current can be caused to sufficiently flow through the intermediary transfer belt 10. For that reason, as in this embodiment, in the drum voltage constitution provided with no primary transfer power source, a low-resistance intermediary transfer belt 10 having the electric resistance values as described above may preferably be used.

Next, the functional effect in the case where the present invention is applied to the above-described drum constitution will be described. In the high-temperature/high-humidity environment, with a lower electric resistance of the intermediary transfer belt 10 as in this embodiment, the secondary transfer current is liable to flow toward the white background portion, not the toner portion (patch portion). For example, in the case where the above-described images as shown in parts (a) and (b) of FIG. 6 are printed, as regards the secondary transfer portion N2, an equivalent circuit as shown in FIG. 12 can be considered. Reference symbols in FIG. 12 represents the following values.

Rr: electric resistance value of secondary transfer roller 20
Rp: electric resistance value of recording material P
Rt: electric resistance value of toner of isolated patch pattern
Ri: electric resistance value of intermediary transfer belt 10
I1: current passing through white background portion
I2: current passing through toner portion (patch portion)

A ratio of I1 to I2 is represented by the following formula (8).

$$I1/I2=(Ri+Rt+Rp)/(Ri+Rp)=1+Rt/(Ri+Rp) \qquad \text{formula (8)}$$

As shown in the formula (8), with a decreasing Ri, the ratio of I1 to I2 (I1/I2) becomes larger. That is, with the decreasing electric resistance value Ri of the intermediary transfer belt 10, the secondary transfer current is liable to flow toward the white background portion, not the toner portion (patch portion). For that reason, in the constitution using the above-described low-resistance intermediary transfer belt 10, in the image in which the toner amount is small, the patch void is liable to occur in some cases. On the other hand, when the absolute value of the secondary transfer voltage is set higher more than necessary in order to suppress the patch void, as described in the embodiment 1, the secondary transfer current flows into the contact member contacting the recording material P in the feeding passage along the recording material P. Then, when the flow of the secondary transfer current into the contact member is repeated, the contact member causes the energization deterioration in some cases.

Therefore, in this embodiment, the present invention is applied to the constitution using the above-described low-resistance intermediary transfer belt 10. That is, the limit voltage Vlimit for suppressing the occurrence of the energization deterioration of the contact member is determined depending on the electric resistance R of the secondary transfer portion, and the secondary transfer voltage is controlled at a voltage which is the limit voltage Vlimit or less. By this, it is possible to suppress the patch void while suppressing the energization deterioration of the contact member. As a result, even in the constitution using the above-described low-resistance intermediary transfer belt 10 while suppressing the energization deterioration of the contact member, it becomes possible to suppress the image defect such as the patch void. In addition, as described in the above-described embodiments, the insufficient transfer can also be suppressed. By this, as in this embodiment, a simple constitution with no primary transfer power source can be realized. Incidentally, as a secondary transfer voltage control method in this embodiment, although the control method in the embodiment 2 can be suitably applied, the control method in the embodiment 1 may be applied.

Thus, in this embodiment, the intermediary transfer member 10 is constituted by the endless belt, and the belt is capable of causing the current to flow in the circumferential direction. Further, in this embodiment, the volume resistivity of the belt is $1 \times 10^9$ $\Omega \cdot$cm or more and $1 \times 10^{10}$ $\Omega \cdot$cm or less.

As described above, according to this embodiment, even in the case where the low-resistance intermediary transfer belt 10 is used, by applying the control method such that the secondary transfer voltage is controlled at a voltage which is not less than the limit voltage Vlimit for suppressing the occurrence of the energization deterioration of the contact member, the patch void and the insufficient transfer can be suppressed while suppressing the energization deterioration of the contact member. Accordingly, according to this embodiment, it is possible to suppress the patch void and the insufficient transfer while providing a simple constitution provided with no primary transfer power source.

As described above, the present invention was described based on the specific embodiments, but the present invention is not limited to the above-described embodiments.

For example, in the above-described embodiments, the image forming apparatus was the color image forming apparatus including a plurality of image forming portions, but the present invention is not limited thereto. The image forming apparatus may also be a monochromatic image forming apparatus including only one image forming portion. In this case, the present invention may only be required to be applied to a transfer portion where the toner image is directly transferred from a photosensitive member as the image bearing member onto a recording material.

According to the present invention, while maintaining a good transfer property, it is possible to suppress image defect with deterioration of the contact member contacting the recording material simultaneously with the transfer member.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2021-152694 filed on Sep. 17, 2021, and 2022-050957 filed on Mar. 25, 2022, which are hereby incorporated by reference herein in their entirety.

What is claimed is:

1. An image forming apparatus comprising:
   an image bearing member configured to bear a toner image;
   a transfer member forming a transfer portion in contact with the image bearing member and configured to transfer the toner image from the image bearing member onto a recording material passing through the transfer portion;
   a power source configured to output a voltage to the transfer member;
   a detecting portion configured to detect at least one of a value of a current flowing through the transfer member when the voltage is outputted from the power source to the transfer member and a value of the voltage applied to the transfer member;
   a controller configured to control the power source;
   an environment detecting portion configured to detect environmental information regarding at least one of ambient temperature and ambient humidity; and
   a fixing member configured to fix the toner image on the recording material, the fixing member being contactable to the recording material simultaneously with the transfer member at a portion,
   wherein the fixing member is electrically grounded through a resistance element and includes an electrically insulating surface layer contactable to the recording material, and
   wherein a resistance value of the electrically insulating surface layer is $1 \times 10^{12} \Omega$ or more and $1 \times 10^{13} \Omega$ or less.

2. The image forming apparatus according to claim 1, wherein the image bearing member is an intermediary transfer member for feeding the toner image, primary transferred from another image bearing member, so as to be secondary transferred onto the recording material in the transfer portion.

3. The image forming apparatus according to claim 2, wherein the intermediary transfer member is constituted by an endless belt capable of permitting a flow of a current in a circumferential direction.

4. The image forming apparatus according to claim 3, wherein a volume resistivity of the belt is $1 \times 10^9$ $\Omega \cdot$cm or more and $1 \times 10^{10}$ $\Omega \cdot$cm or less.

* * * * *